United States Patent
Lunde et al.

(10) Patent No.: US 12,544,785 B2
(45) Date of Patent: Feb. 10, 2026

(54) APPARATUS FOR PRODUCING RECONFIGURABLE WALLS OF WATER

(71) Applicant: Technifex Products, LLC, Valencia, CA (US)

(72) Inventors: Montgomery C. Lunde, Marina Del Rey, CA (US); Leonard M. Aboulache, Valencia, CA (US)

(73) Assignee: Technifex Products, LLC, Valencia, CA (US)

( * ) Notice: Subject to any disclaimer, the term of this patent is extended or adjusted under 35 U.S.C. 154(b) by 0 days.

(21) Appl. No.: 18/946,563

(22) Filed: Nov. 13, 2024

(65) Prior Publication Data

US 2025/0153209 A1    May 15, 2025

Related U.S. Application Data

(60) Provisional application No. 63/548,336, filed on Nov. 13, 2023.

(51) Int. Cl.
B05B 17/08    (2006.01)
B33Y 80/00    (2015.01)

(52) U.S. Cl.
CPC .............. B05B 17/085 (2013.01); *B33Y 80/00* (2014.12)

(58) Field of Classification Search
CPC ............................ B05B 17/085; B33Y 80/00
USPC ................ 239/17, 19, 22, 23, 450, 536, 566
See application file for complete search history.

(56) References Cited

U.S. PATENT DOCUMENTS

| 1,207,790 | A | * | 12/1916 | Peterson | ................... B05B 1/14 239/536 |
| 4,154,439 | A | | 5/1979 | Landsborough | |
| 4,154,440 | A | | 5/1979 | Rusk | |
| 4,294,406 | A | | 10/1981 | Pevnick | |
| 5,005,762 | A | | 4/1991 | Cacoub | |

(Continued)

FOREIGN PATENT DOCUMENTS

| CN | 102513230 A | 6/2012 |
| CN | 103646600 A | 3/2014 |

(Continued)

OTHER PUBLICATIONS

English translation of Abstract for CN102513230, 1 pp.
(Continued)

*Primary Examiner* — Christopher S Kim
(74) *Attorney, Agent, or Firm* — James A. Sheridan; Sheridan Law, LLC

(57) ABSTRACT

There is disclosed an apparatus for producing a water maze from walls of falling water droplets. The apparatus may comprise a plurality of tubular spray bars each perforated with a water inlet for receiving pressurized water. A series of output holes may extend along a length of each spray bar through which the received water is discharged to produce the droplets. A plurality of connectors may be configured to join two or more of the spray bars at one or more vertices in an array producing the water maze. A flow regulator may be disposed between the water inlet and the series of outlet holes for resistively spreading the inlet water evenly across the length of the spray bar prior to the discharging. A 3D printing of the connectors may facilitate a wide variety of horizontal angles required between spray bars joining at the vertices in one-of-a-kind maze designs.

14 Claims, 26 Drawing Sheets

(56) References Cited

U.S. PATENT DOCUMENTS

| | | | |
|---|---|---|---|
| 5,067,653 A | 11/1991 | Araki et al. |
| 5,154,351 A | 10/1992 | Takko |
| 5,265,802 A | 11/1993 | Hobbs et al. |
| 5,270,752 A | 12/1993 | Kataoka et al. |
| 5,368,228 A | 11/1994 | Adamson et al. |
| 5,445,322 A | 8/1995 | Formhals et al. |
| 5,736,969 A | 4/1998 | Kuga et al. |
| 5,862,990 A | 1/1999 | White |
| 6,095,889 A | 8/2000 | Demarinis |
| 6,095,927 A | 8/2000 | Malone |
| 6,176,027 B1 | 1/2001 | Blount |
| 6,557,777 B1 | 5/2003 | Pevnick |
| 6,675,538 B2 | 1/2004 | Candio |
| 6,731,429 B2 | 5/2004 | Lunde |
| 6,855,062 B1 | 2/2005 | Truong |
| 6,906,686 B2 | 6/2005 | Ishikawa |
| 7,682,259 B1 | 3/2010 | Edwards |
| 8,807,452 B2 | 8/2014 | Lunde et al. |
| 9,199,264 B2 | 12/2015 | Tom et al. |
| 9,229,311 B2 | 1/2016 | Yeremian |
| 9,440,251 B2 | 9/2016 | Lunde et al. |
| 9,931,566 B2 | 4/2018 | Harris et al. |
| 10,076,764 B2 | 9/2018 | Lunde et al. |
| 10,765,962 B2 | 9/2020 | King |
| 10,825,422 B2 | 11/2020 | Fuller et al. |
| 11,148,165 B2 | 10/2021 | Fuller |
| 11,938,502 B2 | 3/2024 | Fuller et al. |
| 2013/0119154 A1 | 5/2013 | Sawyer |

FOREIGN PATENT DOCUMENTS

| | | |
|---|---|---|
| EP | 0814369 B1 | 8/2003 |
| JP | 63-200787 | 8/1988 |
| JP | 2-302289 | 2/1990 |
| JP | 03-251280 | 1/1991 |
| JP | 7-289748 | 11/1995 |
| JP | 9-117509 | 5/1997 |
| JP | 3154439 | 2/2001 |
| JP | 6472029 | 2/2019 |
| SE | 9003576-7 | 10/1992 |
| WO | 2018/064230 A1 | 4/2018 |
| WO | 2019/060612 A1 | 3/2019 |

OTHER PUBLICATIONS

English translation of Abstract for CN103646600A, 1 pp.
English translation of Abstract for EP0814369, 1 pp.
English translation of JPH02302289A, 4 pp.
English translation of JP03-251280, 6 pp.
English translation of JPS63200787A, 4 pp.
English translation of JP3154439, 1 pp.
English translation of JP6472029, 1 pp.
English translation of JP2-302289, 4 pp.
English translation of JP3251280, 6 pp.
English translation of JP9-117509, 7 pp.
English translation of JP63-200787, 4 pp.
English translation of the Abstract for SE9003576, 1 pp.
English translation of the Abstract for JP7289748, 1 pp.

\* cited by examiner

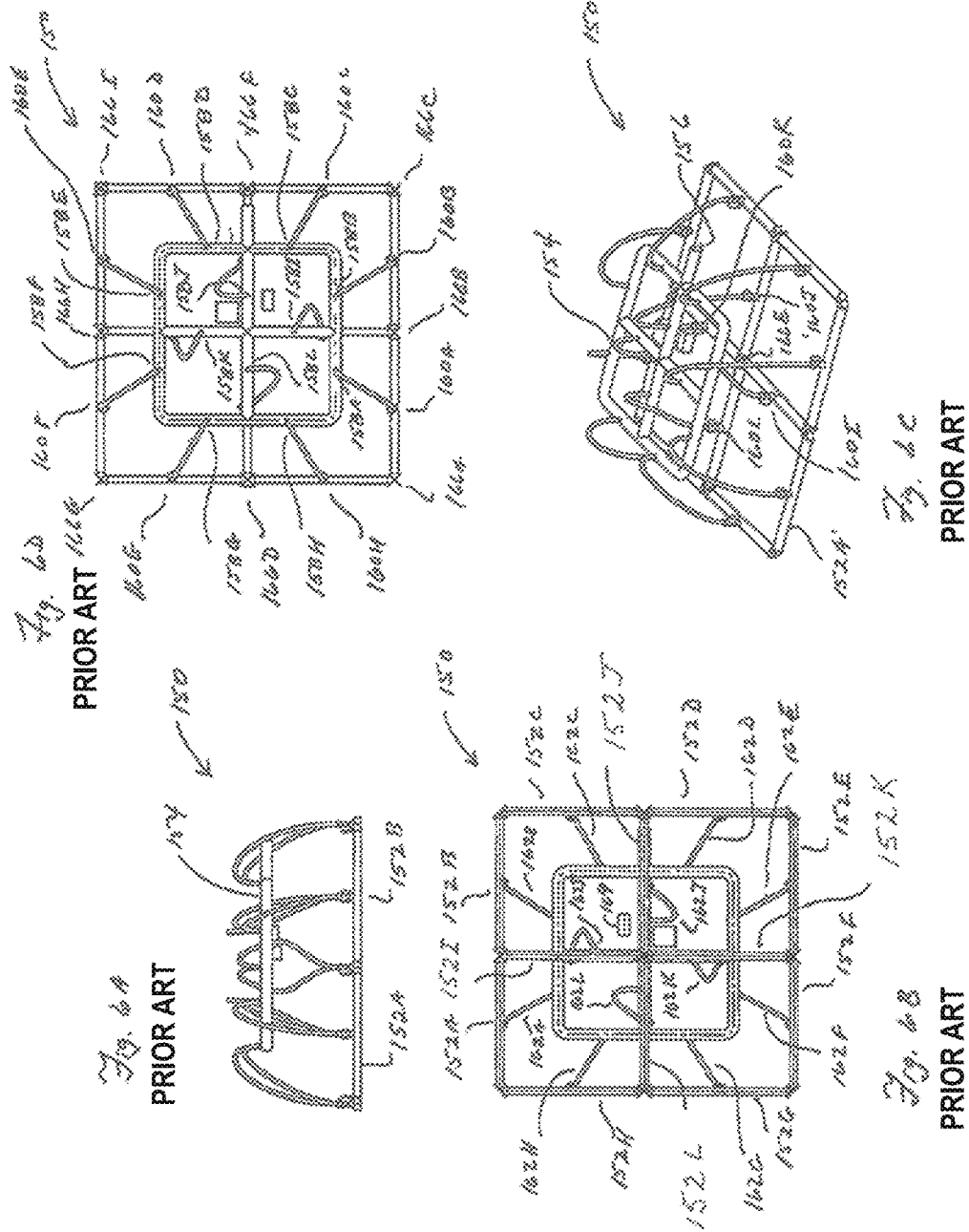

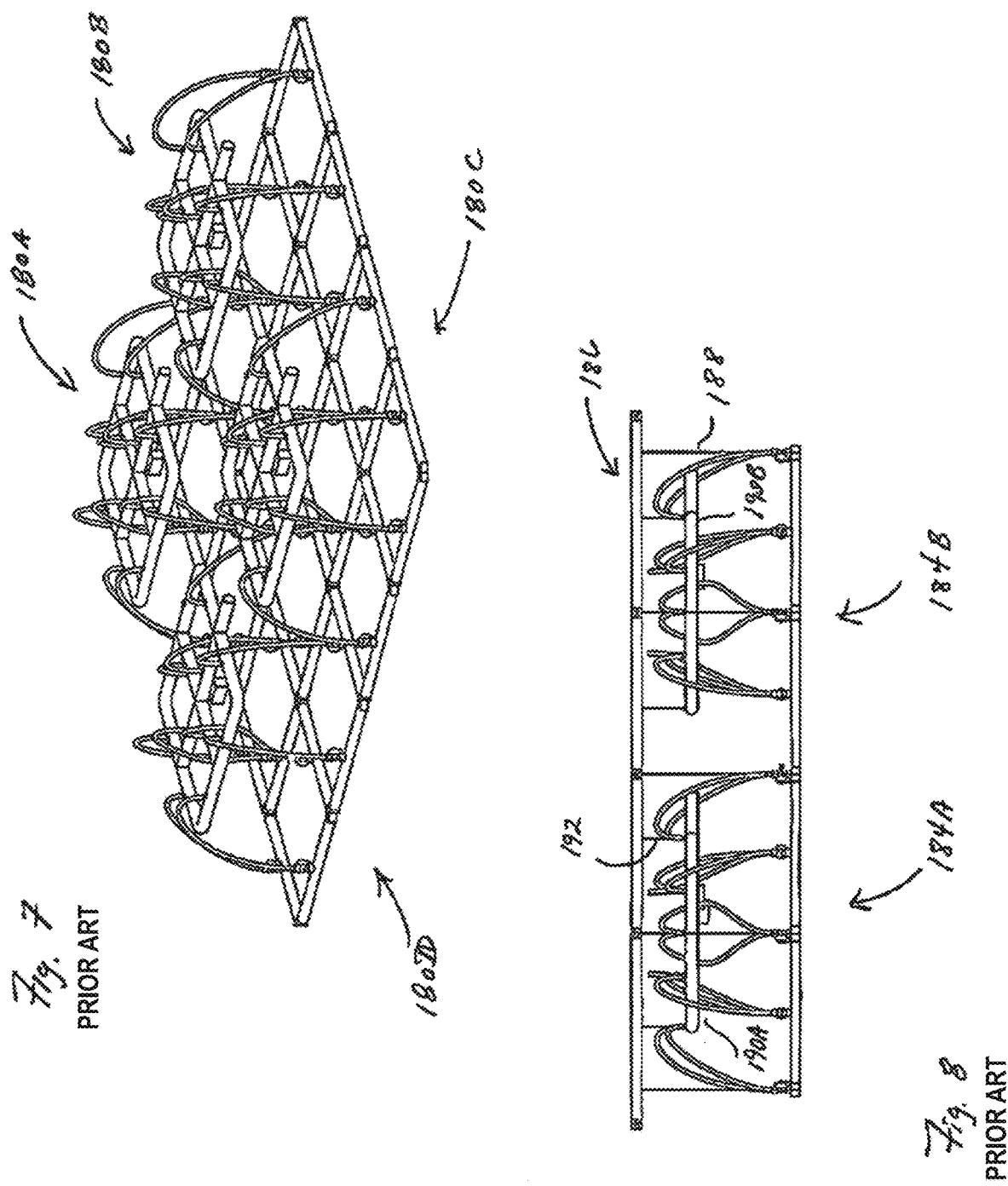

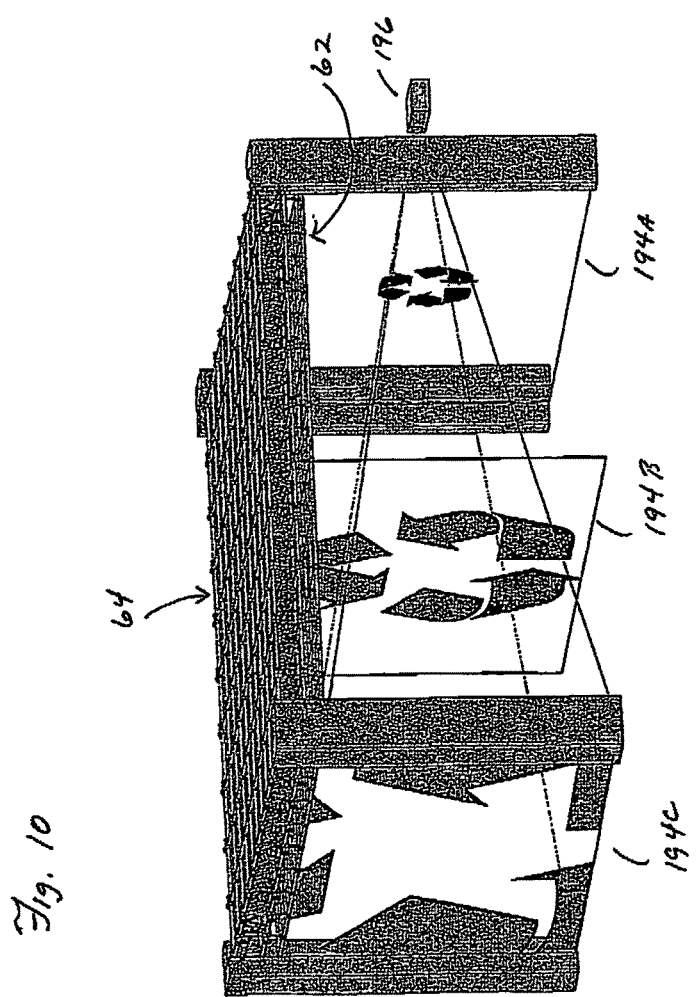

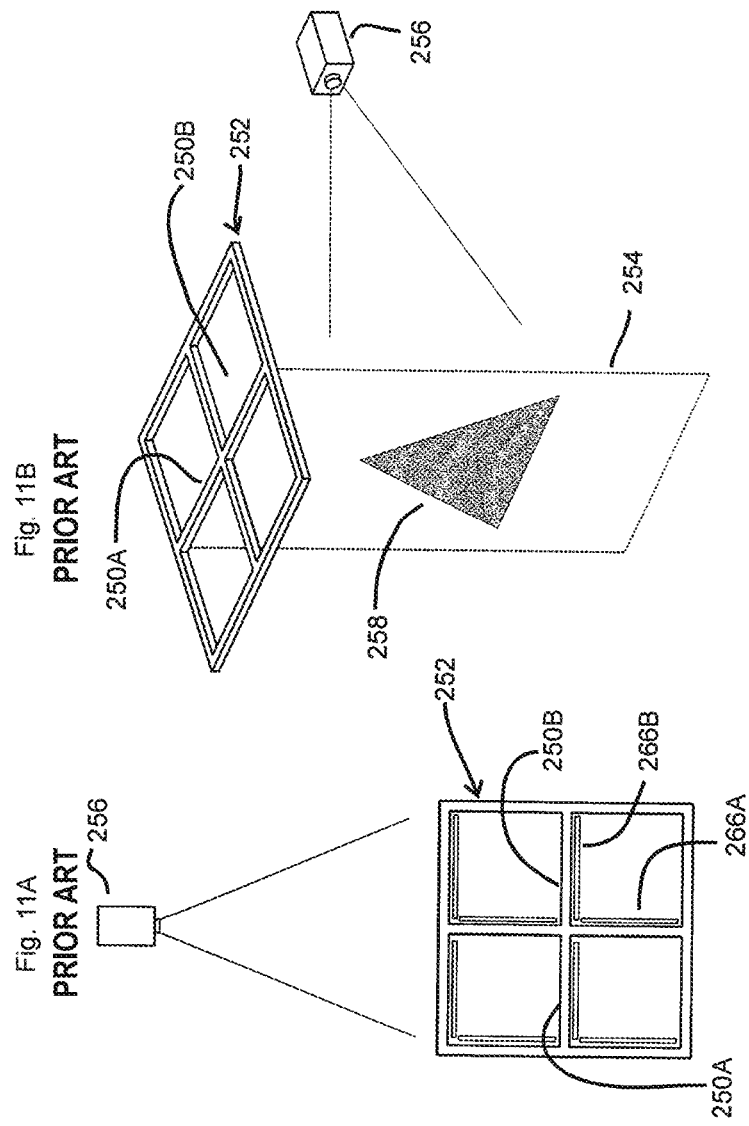

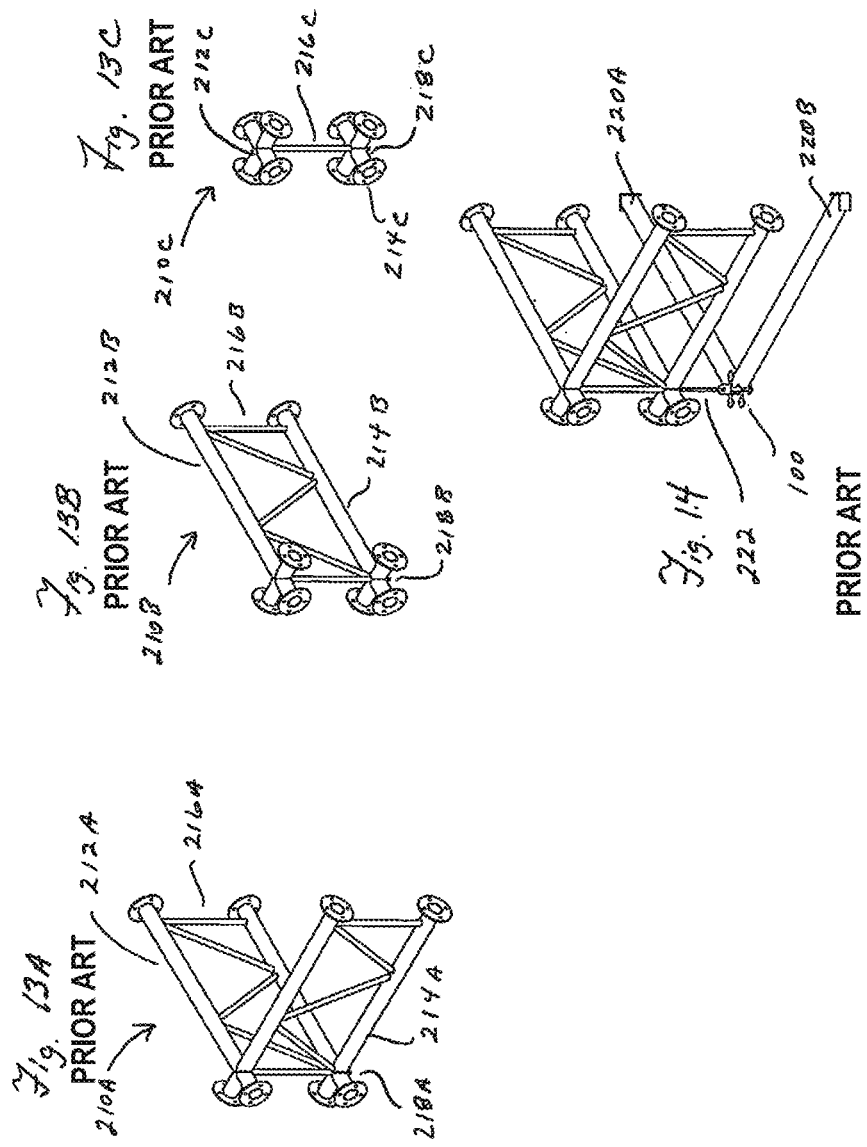

APPARATUS FOR PRODUCING RECONFIGURABLE WALLS OF WATER

CROSS REFERENCE TO RELATED APPLICATIONS

This patent application claims priority to U.S. Provisional Application No. 63/548,336 filed on Nov. 13, 2023 and being entitled APPARATUS FOR PRODUCING RECONFIGURABLE WALLS OF WATER, the entire contents of application No. 63/548,336 being expressly incorporated by reference herein.

FIELD OF THE INVENTION

The present invention relates to an apparatus for producing a reconfigurable water maze and capable of being adapted to produce visual effects in which light engages one or more walls of water.

BACKGROUND

A water maze may include an outer perimeter enclosing a drained floor area configured for walking. Inner walls comprising planes of falling water may form an intriguing maze path within the outer perimeter. Complex path branching, combined with the sounds and smells of the water and a projected light show, may create a compelling experience at a theme park or special event. However, the custom lengths of the water-dispensing pipes overhead, and the custom connector angles required for the suspended array, may be expensive to fabricate and may involve long lead times for designing molds and machining unique connectors.

One solution to the high cost and lead time for building a one-of-a-kind water maze may be to use as many standard parts as possible, such as PVC pipes and connectors, where each length of pipe produces a water panel. However, this may limit the geometry of the suspended array to boring 90° angles. Further, instantiating a discharge of water from a source pipe in the array may occur immediately in the middle of the PVC source pipe but be delayed at the ends, resulting in a sloppy appearance as various water panels are turned off and on.

Another solution in the art is to narrow the capacity or diameter of the water pipe to force a more instantaneous turn-on. But the falling droplets under this restriction may create a semi-opaque wall that is too sparse to capture a projection of light or images. Furthermore, gaps may occur between adjacent water panels due to a lack of dispensing apertures at the connectors between the pipes.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The present invention is directed to an apparatus for use in producing a wall of falling water droplets. In one embodiment, the apparatus may comprise a plurality of tubular integral spray bars, each one of the spray bars extending from one end to another end opposite the one end. Each one of the spray bars may include a water inlet for receiving pressurized water and may include a series of output holes along a length of the spray bar through which the received water is dischargeable. The apparatus may further comprise a plurality of connectors. Each one of the connectors may be configured to join a free end of a first one of at least two spray bars with a free end of a second one of the least two spray bars. A flow regulator may be disposed interiorly between the water inlet and the series of outlet holes for spreading the inlet water evenly across the length of the spray bar prior to the discharging. A connected array of the plurality of flow-regulated spray bars may be capable of producing the wall of falling water droplets simultaneous across the series of outlet holes.

In another embodiment, the apparatus may comprise a plurality of tubular integral spray bars. Each one of the spray bars may extend from one end to another end opposite the one end, and may include a water inlet adapted for receiving pressurized water. A series of output holes may be disposed along a length of the spray bar through which the received water is dischargeable to produce the falling water droplets. The apparatus may further include a plurality of seamless connectors. Each one of the connectors may be configured to join a free end of one of at least two of the plurality of spray bars with a free end of another of the at least two spray bars. Joining the plurality of spray bars with the seamless connectors may form an array for producing the wall. The N-way connector and the N spray bars being joined by the connector at one vertex may be configured relative to one another to make substantially seamless the discharge of droplets across the N-way connector.

In a further embodiment, a method is presented for building a horizontal array for producing reconfigurable walls of falling water droplets receivable by a drain floor. The method may comprise forming a plurality of tubular integral spray bars each having a length between two ends. The method may further comprise dividing an interior volume of each of the plurality of spray bars with a porous shelf separating the volume into an inlet interior and an outlet interior. The method may further comprise perforating each one of the spray bars with (1) a water inlet conductive with the inlet interior and (2) a series of outlet holes along the length for discharging the falling water droplets from the outlet interior. The method may further comprise terminating, with one end of a connector portion, each of N of the plurality of spray bars assigned to a vertex in the array. The connector portion may present a miter style joining surface at the other end for stably meeting N−1 other spray bars at the vertex.

The method may further comprise joining the N terminated spray bars assigned to each of the vertices in the array. The array may be configured to be adaptable for selectively switching pressurized water to one or more of the water inlets. The porous shelf may be configured to invite resistive flow into the outlet interior for simultaneous discharging across the series of outlet holes.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIGS. 6A-6D illustrates a module comprising a group of spray bars in the prior art.

FIG. 7 illustrates a larger array of spray bars in the prior art.

FIG. 8 illustrates two spray bar array suspended from an overhead support in the prior art.

FIG. 10 illustrates the use of the apparatus to produce a light show in the prior art.

FIGS. 11A-11B respectively are a plan view and a perspective view of a single screen of falling water droplets and a projected image in the prior art.

FIGS. 13A-13C illustrate overhead support for suspending the spray bars in the prior art.

FIG. 14 illustrates a pair of connected spray bars suspended from the overhead support of FIGS. 13A-13C in the prior art.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Referring first to FIGS. 1-15, this first section of the detailed description describes contextualizing art drawn from U.S. Pat. No. 8,807,452, which has a common inventor. The present disclosure description begins at paragraph.

Figure 1A:
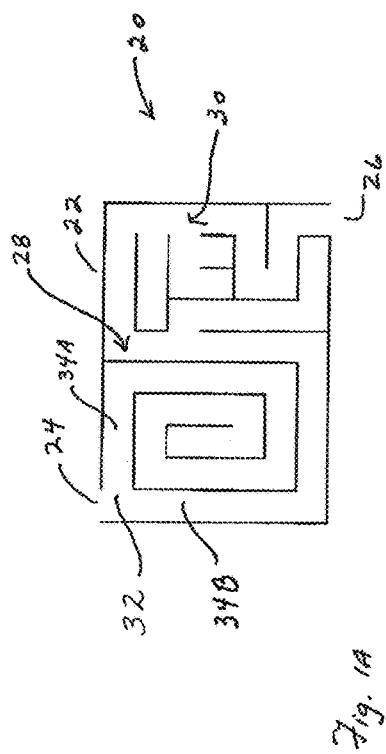
FIGS. 1A and 1B respectively are plan views of a maze and a labyrinth.

A maze is a structure comprised of an outer wall that encloses an area and, in many cases, an inner wall structure that is located within the enclosed area. The outer wall and the inner wall structure define a path between an entrance and an exit that are each associated with the outer wall. The path is the area within the outer wall that is not part of any inner wall structure and over which a player is allowed to move or navigate. Characteristic of a maze is at least one complex branch, i.e., a point at which two or more passageways of the path intersect and the solver of the maze is confronted with a decision as to which of two or more passageways is to be taken. FIG. 1A is an example of a maze 20.

The maze 20 includes an outer wall 22 that encloses an area. Associated with the outer wall are an entrance 24 at which a player enters the maze and an exit 26 at which a player that has successfully negotiated the maze exits the maze. While the entrance 24 and the exit 26 are defined by separate gaps in the outer wall 22, it is possible for the entrance and the exit of a maze to be defined by the same gap in an outer wall. The maze 20 includes an inner wall structure 28 that is located within the area enclosed by the outer wall 22. The inner wall structure 28 is comprised of several subsidiary walls, some of which engage the outer wall 22. However, an inner wall structure that is one wall is also feasible. The outer wall 22 and inner wall structure 28 define a path 30. In the maze 20, the path 30 is the white area within the outer wall 22.

Continuing, the maze 20 includes at least one complex branch, a location on the path 30 where two or more passageways intersect and at which a player that is navigating the maze is confronted with a decision as to which of the two passageways to take. Location 32 within the maze 20 is a complex branch location. Location 32 is at the intersection of passageways 34A, 34B and is a location at which a player must make a decision as to whether to follow passage 34A, passageway 34B, or exit the maze 20 via the entrance 24.

While the maze 20 has been described as including the outer wall 22 and the inner wall structure 28, a maze having an outer wall and no inner wall structure is feasible. In such a maze, the outer wall alone defines the path.

Continuing, a labyrinth is a structure comprised of an outer wall that encloses an area and, in many cases, an inner wall structure that is located within the enclosed area. Like a maze, the outer wall and inner wall define a path between an entrance and an exit that are each associated with the outer wall. The path is the area within the outer wall that is not part of the inner wall structure and over which a player is allowed to navigate. A labyrinth, unlike a maze, does not have any complex branches. Consequently, the player only needs to follow the path. In many cases, the path terminates at a dead end that precludes further progress by the player. In such a labyrinth, after the player reaches the dead end, the player reverses direction to retrace their steps and exit at the same location at which the player entered the labyrinth. As such, the entrance and the exit of the labyrinth are defined by the same gap in the outer wall.

Figure 1B:
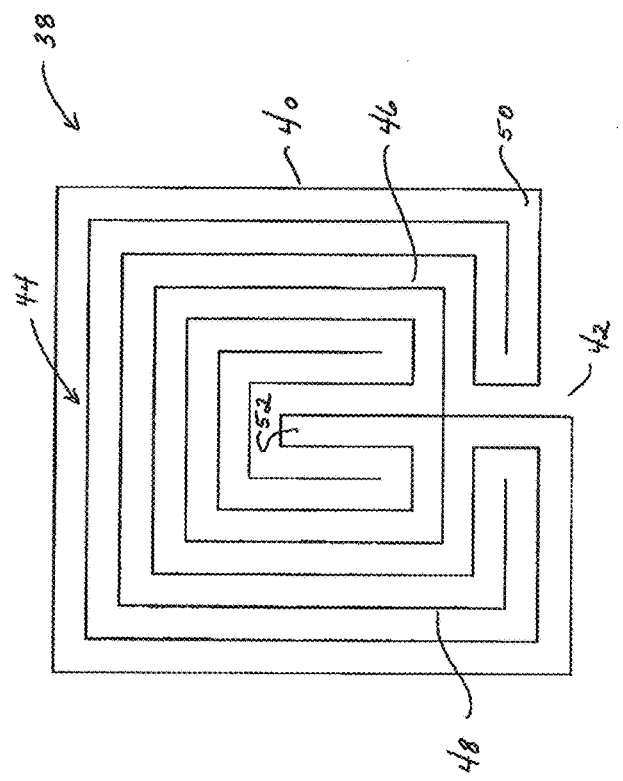

Continuing, it is, however, possible to have a labyrinth with an entrance and an exit that are separate from one another and defined by separate gaps in the outer wall. FIG. 1B is an example of a labyrinth 38. The labyrinth 38 includes an outer wall 40 that encloses an area. Associated with the outer wall is an entrance/exit 42 which is the location at which a player both enters and exits the labyrinth 38. The labyrinth 38 includes an inner wall structure 44 that is located within the area enclosed by the outer wall 40. The inner wall structure 44 is comprised of a first inner wall 46 that has four branches of varying length and a second inner wall 48. However, an inner wall structure that has only one wall or has more than two walls is feasible. The outer wall 40 and inner wall structure 44 define a path 50. In the labyrinth 38, the path 50 is the white area within the outer wall 40. The labyrinth 38 has a dead end 52 that, once reached by a player, requires the player to reverse direction and retrace their steps to exit the labyrinth 38 at the entrance/exit 42. While the labyrinth 38 has been described as including the outer wall 40 and the inner wall structure 44, a labyrinth having an outer wall and no inner wall structure is feasible. In such a labyrinth, the outer wall alone defines the path.

As used hereinafter to describe one or more embodiments of the invention, the term "maze" refers to a maze that has one or more complex branches or a labyrinth that does not having any complex branches.

Figure 2:
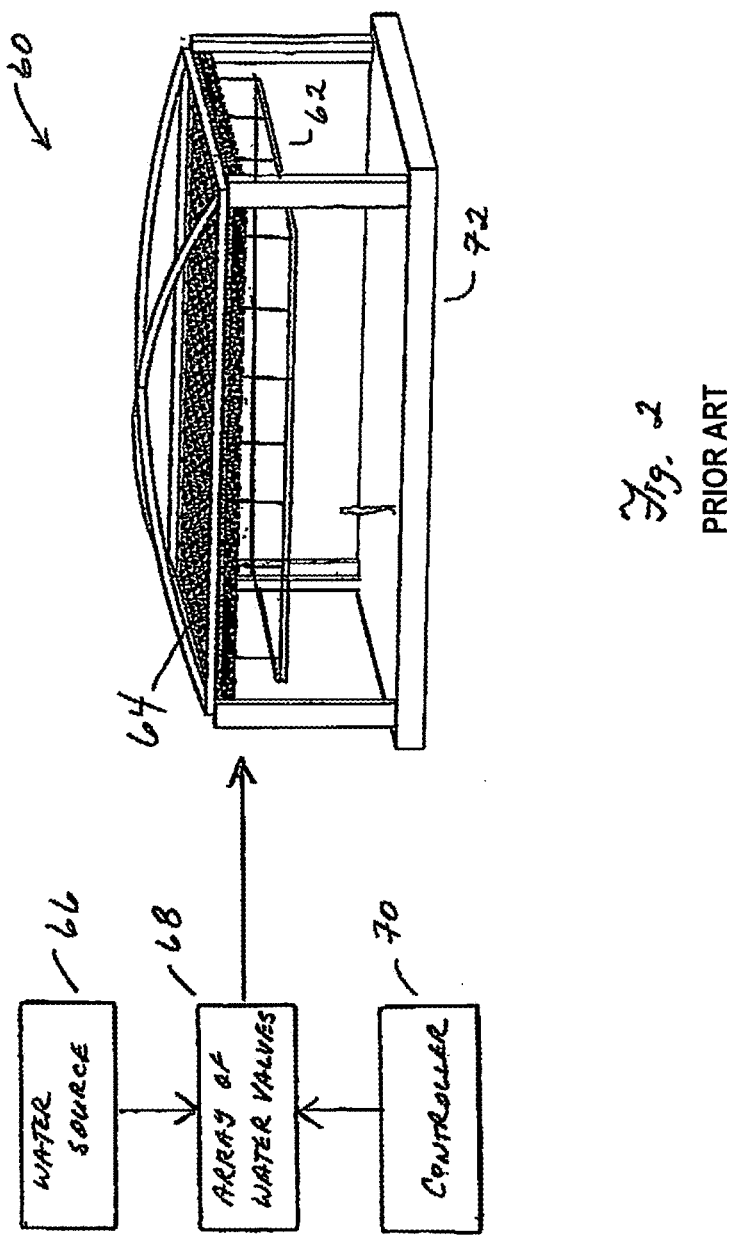
FIG. 2 is a block diagram of an apparatus for producing a reconfigurable water maze in the prior art.
Figure 3:
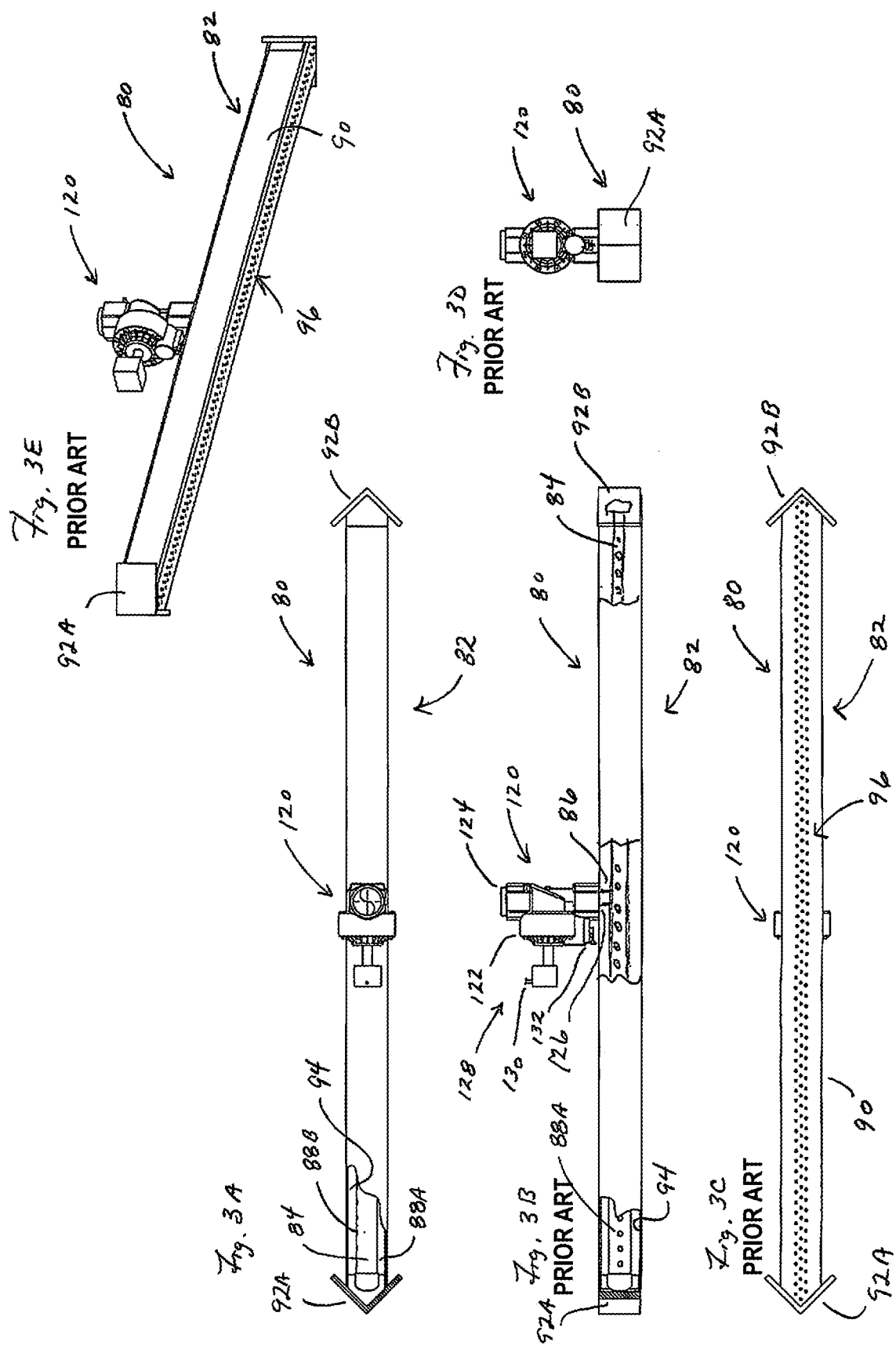
FIGS. 3A-3E illustrate an embodiment of a spray bar and associated valve for the apparatus in the prior art.
Figure 4:
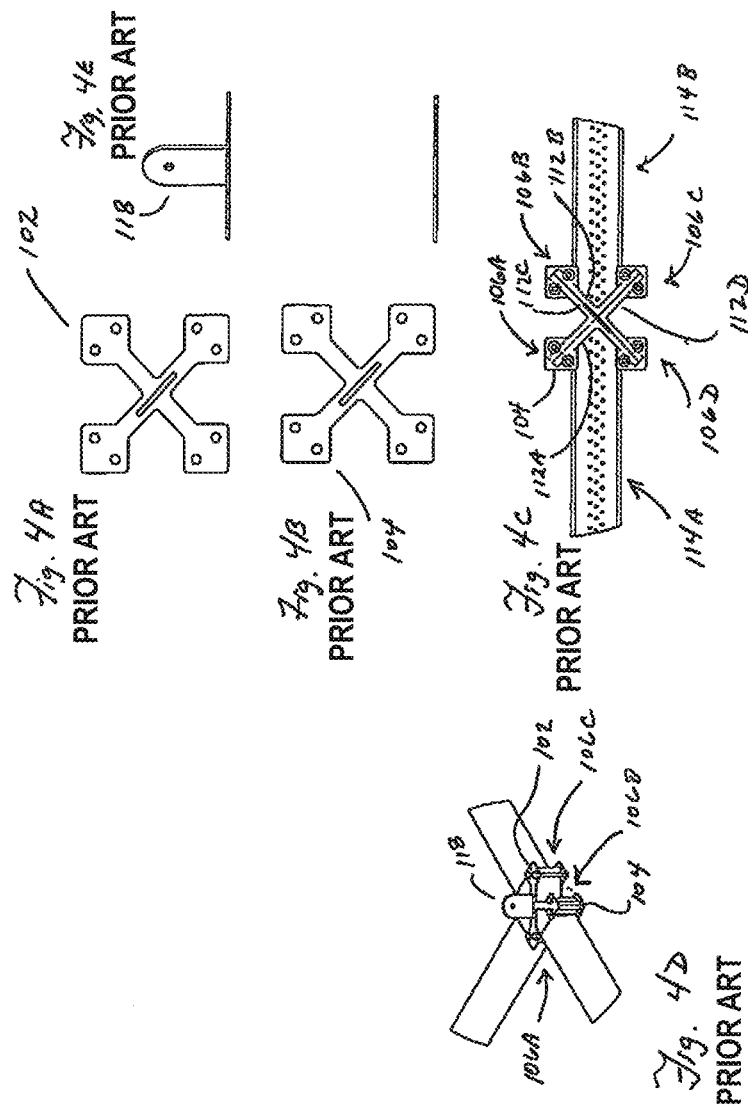
FIGS. 4A-4E illustrate a bracket system used to connect spray bars in the prior art.

Continuing, with reference to FIG. 2, one embodiment of an apparatus for producing a water maze in which falling water is used to form the walls of a maze and allowing reconfiguration of the maze, hereinafter referred to as apparatus 60, is described. Generally, the apparatus 60 includes: (a) an array of spray bars 62, (b) an overhead support 64 from which the array of spray bars 62 is suspended; (c) a water source 66, (d) an array of valves 68 that is used to control the application of water provided by the water source 66 to the array of spray bars 62, (e) a controller 70 that controls the array of valves 68 so that water is provided to certain spray bars of the array of spray bars 62 so as to define the walls of a maze, and (f) a drained floor 72.

The array of spray bars 62 is comprised of a number of spray bars that are located relative to one another so that a subset of the array of spray bars can be used to define an outer wall of a maze and another subset of the array of spray bars can be used to define an inner wall structure of a maze. In the illustrated embodiment, the spray bars are situated relative to one another so as to form a grid pattern comprised of squares. Each spray bar in the array of spray bars 62 is of substantially the same length, a length that is equal to the smallest square presented by the grid pattern of adjoining squares. While it is feasible to use spray bars in an array of spray bars that are of different lengths, it is believed that the use of spray bars of different lengths is likely to make the manufacturing of the spray bars more complicated, the assembly of the apparatus more difficult, and potentially lead to the production of a water mazes or mazes of varying consistency.

Continuing, with reference to FIGS. 3A-3E, an embodiment of a spray bar 80 is described. The spray bar 80 is comprised of an outer tubular member 82 and an inner tubular member 84. The inner tubular member 84 is located within the outer tubular member 82, has an inlet 86 adapted to receive water from an associated valve when the valve is open, and two series of outlet holes 88A, 88B that each extend along the length of the member 84 and through which water is ejected. The outer tubular member 82 includes a tubular body 90 with corner-mitered open ends that are closed by a pair of corner end caps 92A, 92B. The tubular body 90 has an inner surface 94 for receiving water ejected from the two series of outlet holes 88A, 88B of the inner tubular member 84. The tubular body 90 also has a series of outlet holes 96 through which water passes to form a wall of falling water droplets that, in turn, form a wall or a portion of a wall of a maze.

In the illustrated embodiment, the outer tubular member 82 is approximately 40" in length. In many instances, when a spray bar is not ejecting water to form a wall or portion of a wall of a maze, the spray bar is associated with a passageway of the path of the maze and potentially defines the width of such a passageway. The length of 40" is believed to be an appropriate width for a passageway. However, spray bars of having a greater or lesser length are feasible and may be more appropriate in a particular situation.

Continuing, the inner tubular member 84 is made from PVC pipe that is capped at both ends. The tubular body 90 is made from PVC and the ends caps 92A, 92B are made from PVC. The end caps 92A, 92B are connected to the tubular body 90 by glue. The mass of the spray bar 80 is approximately 33 ounces/930 grams. It should be appreciated that other light weight materials known to those in the art can be used to realize the inner tubular member 84, tubular body 90, and end caps 92A, 92B. The relatively low mass contributes to the ability to suspend the spray bar 80 and the array of spray bars 62 from an overhead support and reduce the need for upright supports to support the array. In certain cases, any upright supports associated with the overhead support may only be about the periphery of the overhead support. In other cases, upright supports may be needed within the "shadow" of the array of spray bar 62 but spaced further from one another than would otherwise be the case. Moreover, the relatively low cumulative mass of the array of spray bars 62 contributes to being able to suspend the array from an overhead support that covers a substantial area, i.e., an overhead support that spans relatively long distances between points at which upright support is needed. While the use of other lightweight materials for one or more of the inner tubular member 84, tubular body 90, and end caps 92A, 92B, the noted materials are currently preferred due to their relatively low cost and ease with which they can be incorporated into the design of the spray bar 80.

The tubular body 90 is made from a material with a rectangular cross-section to, at least in part, facilitate the machining of the material to create the mitered ends to which the end caps 92A, 92B are attached. The use of a material with a non-rectangular cross-section (e.g., a circular cross-section) is feasible. However, the use of such a material is likely to make the machining of the mitered ends more difficult. Further, it should be appreciated that a material with a U-shaped or open-sided cross-section can be used in place of a tubular structure, provided the U-shaped or open-sided structure is capable of sufficiently containing the water output by the inner tubular member 84.

Continuing, the dimensions of the inner tubular member 84 and the space and size of the series of outlet holes 88A, 88B associated with the inner tubular member 84 are chosen so that, for the anticipated rate of flow of water into the inlet 86, the flow of water out of each of the series of outlet holes 88A, 88B is roughly equal, thereby substantially evenly distributing the water along the inner surface 94 of the tubular body 90. In the illustrated embodiment, the inner tubular member is 1" in diameter and approximately 40" long. Adjacent holes in each of the group of outlet holes are 0.75" apart and each hole is about 0.25" in diameter.

The series of outlet holes 96 are designed to cumulatively discharge at least as much water per unit time as the inner tubular member 84 is discharging through the series of outlet holes 88A, 88B for the anticipated flow of water into the inlet 86 of the inner tubular member 84. As such, the interior of the outer tubular member 82 accumulates little, if any, water when the spray bar is active. The inner tubular member 84 has a relatively low volume and, as such, contains relatively little water even when the spray bar is in operation. The cumulative mass of the spray bar 80 and the water within the spray bar during operation (i.e., the mass of water in the inner tubular member and flowing down the inner surface 94 of the tubular body 90) is relatively low. For the illustrated embodiment, this cumulative mass is estimated to be about 70 ounces/1984 grams. This, too, contributes to the ability to suspend the array of spray bars 62 from an overhead support that covers a substantial area.

Continuing, the inner tubular member 84 is designed so that, once the flow of water to the member is terminated, the flow of water from the series of outlet holes 88A, 88B terminates shortly thereafter. This is achieved by appropriately choosing the dimensions of the member 84 and the location of the outlet holes 88A, 88B. In the illustrated embodiment, the member 84 has a relatively small diameter of 1" and the outlet holes 88A, 88B are located along the mid-line of the member 84 when the member is horizontally disposed. As such, when the flow of water into the member 84 is terminated, there is only the water between the upper half of the member 84 (as horizontally disposed and viewed in cross-section) and the outlet holes 88A, 88B that is available to flow out the holes, a relatively small amount of water that will be discharged relatively quickly.

Moving the holes closer to the top of member 84 would provide even less water to be discharged following termination of the flow of water to the member and the water would be discharged over a lesser amount of time. Conversely, moving the holes closer to the bottom of the member 84 would provide more water to be discharged following the termination of the flow of water to the member and the water would be discharged over a greater amount of time. For a larger diameter member, the location of the holes has a greater significance on the amount of time needed to discharge the water following termination. For a smaller diameter member, the location of the holes has a lesser significance.

It should be appreciated that the foregoing can be applied to an inner tubular member that has a different cross-section.

It should also be appreciated that the relatively quick termination of the flow of water from the series of outlet holes 88A, 88B of the inner tubular member 84 coupled with the series of outlet holes 96 of the outer tubular member 82 being designed to cumulatively discharge at least as much water per unit time as the inner tubular member 84 is discharging through the series of outlet holes 88A, 88B results in a spray bar that ceases discharging water very soon after the flow on water into the spray bar is terminated, i.e., the spray bar 80 can be "turned off" relatively quickly.

Continuing, it should be appreciated that when the flow of water to the inner tubular member 84 is commenced, the flow of water from the series of outlet holes 88A, 88B commences shortly thereafter. This, too, is a function of the dimensions of the member 84 and the location of the outlet holes 88A, 88B. When the flow of water into member 84 is commenced, water will begin to flow out of the outlet holes 88A, 88B when the water level has been raised from the current water level in the member to the level of the holes. Water will begin to flow from the outlet holes 88A, 88B at the desired rate when the member is entirely filled and under the desired pressure. In this case, moving the holes closer to the top of the member 84 would increase the time needed for the outlet holes 88A, 88B to start discharging water for a given inlet flow rate. Conversely, moving the outlet holes closer to the bottom of the member 84 would decrease the time needed to for the outlet holes to start discharging water for a given inlet flow rate. It should be appreciated that the relatively quick commencement of the flow of water from the series of outlet holes 88A, 88B of the inner tubular member 84 results in a spray bar that commences discharging water very soon after the flow of water into the spray bar is commenced, i.e., the spray bar 80 can be "turned on" relatively quickly.

Further, the series of outlet holes 96 are designed to discharge low-pressure streams of water that each breaks into a discontinuous stream of water droplets due to air resistance, rather than continuous streams or a continuous wall of water. These discharged droplets are discharged over a distance and form a relatively translucent wall of water that is presently considered adequate for use in producing a wall or portion of a wall of a maze. It should be appreciated that, because the wall of water droplets produced by the spray bar 80 is adequate for generating all or a portion of the wall of a maze, the amount of water needed to produce a maze is substantially less than that required to produce the same maze in a system that employs a piping system that discharges continuous streams or sheets of water.

Continuing, in the illustrated embodiment, the series of outlet holes 96 is comprised of three parallel lines of holes with each line have equally spaced holes and each line of holes being offset from the adjacent line of holes. In the illustrated embodiment, one line of holes is separated from the adjacent line of holes by about 0.25", the holes in a line are separated from one another by about 0.5", and each hole has a diameter of about 0.13". If a more translucent or less translucent wall of water droplets is desired, changes can be made to the number of lines of holes, spacing of holes, and/or size of the holes. Such changes may, however, require additional changes in the other elements of the spray bar and/or the rate at which water is received by the spray bar.

The spray bars in the array of spray bars 62 are located relative to one another so as to form a grid pattern of squares. Moreover, spray bars in the array 62 are connected to one another in a manner that: (a) facilitates the establishment of the grid pattern and (b) renders any gap between the end of one spray bar and the ends of the other spray bars to which the one spray is connected relatively small. Keeping this gap small and locating the series of outlet holes 96 of the spray bar such that any wall of water droplets produced using the spray bar extends substantially from one end of the tubular body 90 to the other end of the tubular body 90 renders any gap in the walls of water produced by sprays bars whose ends are connect to one another correspondingly small.

Continuing, with reference to FIGS. 4A-4D, the system for connecting the ends of multiple sprays bars to one another is described. Generally, the system is comprised of the corner end cap of each of the spray bars that are to be connected to another and a bracket system that engages the end cap associated with the end of the spray bars that are to be connected to one another. As shown in FIG. 3A, the end cap 92A is comprised of a pair of planar members with an interior angle of 90° between the members, an exterior angle of 270° between the members, and a portion of each planar member extending past the lateral extent of the tubular body 90. The end cap associated with the end of each of the spray bars that are to be connected to one another is substantially identical to the end cap 92A. The bracket system 100 is comprised of a top member 102, a bottom member 104, four pairs of nuts and bolts 106A-106D that each engage the top member 102 and bottom member 104, and if needed, one or more "dummy" end caps that are not attached to a spray bar.

In operation, the top member 102 engages the top edges of four end caps, the bottom member 104 engages the bottom edges of the four end caps, and the four pairs of bolts 106A-106D connect the top member 102 to the bottom member 104. Further, located between each of the pairs of bolts 106A-106D is at least a portion of that portion of the planar member that extends beyond the lateral extent of the tubular body 90 (or, in the case of a dummy end cap, would extend beyond such a lateral extent if the dummy end cap was associated with a spray bar) for two end caps. As such, the bracket system 100 and end caps cooperate to establish a miter-type joint between the four end caps. Typically, at least two of these end caps are associated with two different spray bars that are to be connected to one another.

Continuing, if only two spray bars are to be connected, then two of the end caps are associated with the two spray bars that are to be connected to one another and the other two end caps are dummy end caps. FIG. 4C illustrates such a situation. Specifically, the bracket system 100 cooperates with end caps 112A-112D to establish a miter-type joint between the end caps and connect spray bar 114A to spray bar 114B. End caps 112A and 112B are respectively parts of spray bars 114A, 114B and end caps 112C and 112D are dummy end caps, neither of which is associated with a spray bar. Similarly, if only three bars are to be connected, then three of the end caps are associated with the three spray bars that are to be connected to one another and the fourth end cap is a dummy end cap. FIG. 4D illustrates such a situation.

It should be appreciated that the angle between the planar members of an end cap can be changed and the bracket system changed to engage the ends of a different number of spray bars. For instance, the exterior angle between the planar members of an end cap can be changed to 240° and the bracket system changed so as to engage the ends of three instead of four spray bars. This would facilitate the creation of an array of spray bars that has an equilateral triangle pattern instead of a grid pattern. Similarly, the exterior angle between the planar members of an end cap can be changed to 300° and the bracket system changed so as engage the ends of six spray bars.

Continuing, with reference to FIG. 4E, an overhead connector surface 118 is attached to the top member 102 of the bracket system 100 and facilitates the connection of the bracket system and any attached spray bars to the overhead support 64. In the illustrated embodiment, the connector surface 118 defines a hole that is suitable for engaging a hook or similar structure associated with whatever device or devices are used to engage the overhead support. Other types of overhead connecting surfaces are feasible. For instance, a surface that defines a hole for engaging a rod of all thread is feasible. An overhead connector surface can be placed elsewhere. For instance, an overhead connector surface can be attached to the outer tubular member 82 of the spray bar 80 and preferably done in a manner that does not interfere with the wall of water droplets produced when the spray bar is activated.

The array of valves 68 is used to control the application of water provided by the water source 66 to the array of spray bars 62. In the illustrated embodiment, each valve in the array of valves 68 is associated with only one spray bar in the array of spray bars 62. In some instances, a long spray bar may require two or more valves of the array of valves 68 with each valve operatively connected to a long inner tubular member or with each valve connected to one of a number of shorter inner tubular members in order to distribute the water adequately within the outer tubular member. Nonetheless, each of the valves of the array of valves 68 is associated with only one spray bar.

Continuing, with reference to FIGS. 3A-3E, a valve 120 that is associated with the spray bar 80 is described. The valve 120 has a body 122 that defines an inlet port 124 for receiving water provided by the water source 66 and an outlet port 126 for providing water to the inlet 86 of the inner tubular member 84 of the spray bar 80. The valve 120 also has an air pilot valve 128 that is used to place the valve 120 in a first state in which water is allowed to pass through the outlet port 126 to the inner tubular member 84 or in a second state in which water is prevented from passing through the outlet port 126 to the inner tubular member 84. The air pilot valve 128 has a pneumatic input 130 for engaging a pneumatic line that provides a flow of air and an electrical input 132 that controls whether the air received at the pneumatic input 130 is allowed to pass through and place the valve in the first state or prevented from passing through and place the valve in the second state. The electrical input 132 receives an electrical signal that is low voltage and low amperage due to the proximity of the valve 120 to water and to individuals that may come into contact with the water. In the illustrated embodiment, the valve 120 is a model 57100 valve manufactured by Orbit.

Figure 5:
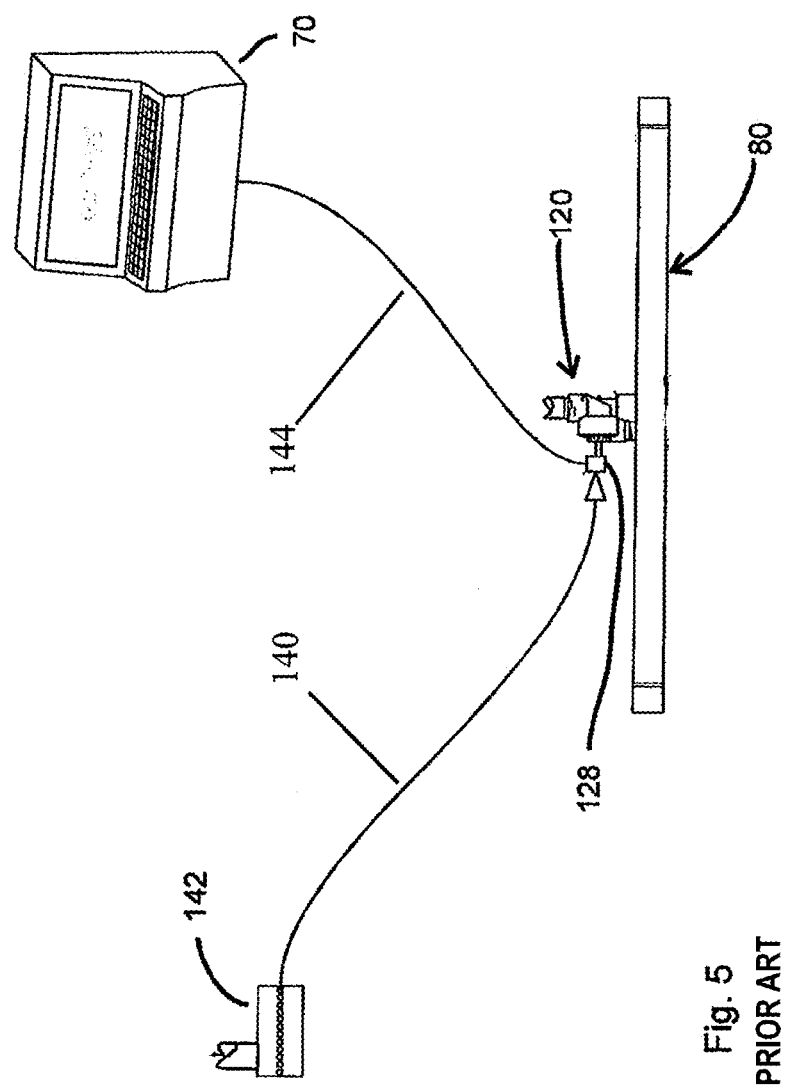
FIG. 5 illustrates a valve control system in the apparatus of the prior art.

With reference to FIG. 5, the operation of the valve 120 is described. A pneumatic line 140 provides air to the pneumatic input 130 of the valve. Typically, the pneumatic line 140 originates at a pneumatic manifold 142 that receives air from an air source and distributes the received air to a plurality of outlet ports that each engages a pneumatic line that runs to the pilot valve 128 associated with a valve 120. The controller 70 provides an electrical signal via an electrical line 144 to the electrical input 132 of the air pilot valve 128 that determines whether the air provided by the pneumatic line 140 is allowed to pass through the pilot valve 128 and place the valve in the first state or the air provided by the pneumatic line is prevented from passing through the valve and any air that has previously passed through is vented to the atmosphere so as to place the valve in the second state. Other types of valves are feasible. For example, valves that are entirely pneumatic can be employed. However, such valves typically have a substantially slower response time. Hydraulic valves can also be employed.

Continuing, in the illustrated embodiment, there is a valve 120 associated with each spray bar in the array of spray bars 62, which collectively is the array of valves 68. Further, the controller 70 is capable of providing an electrical signal to each such valve via an electrical line that runs to the electrical input of the valve. Consequently, the controller 70 defines whether the valve 120 associated with each spray bar in the array of spray bars 62 is in the first state or the second state and, hence, whether the spray bar is producing a wall of falling water droplets that define a wall or a portion of a wall of a maze or not producing a wall of falling water droplets.

In particular applications, locating all or part of the array of valves 68 a significant distance from the array of spray bars 62 may be feasible. With respect to any valves that are located at a significant distance from the array of spray bars 62, the concerns of the proximity of electricity to water and individuals that may come into contact with the water may abate and allow for the use of electrically driven valves that would not be appropriate if located as in the illustrated embodiment.

Continuing, in other applications, the use of manual valves that eliminate the need for the controller 70 to define the state of any such valves may be appropriate. Any such manual valves could be attached to the spray bar, as the valve 120 is attached to the spray bar 80, or located a significant distance from the array of spray bars 62. Further, a group of manual valves that are located a significant distance from the array of spray bars 62 could be arranged in a manual valve manifold. Regardless of whether any such manual valves are attached to spray bars or located distally from the array of spray bars, the use of manual valves is likely to adversely affect the speed with which the state of valves can be altered and the configuration of a maze changed.

Locating a valve a significant distance from the spray bar with which the valve is associated may, in certain situations, also reduces the speed with which the spray bar transitions from providing a wall of water droplets to not providing a wall of water droplet (i.e., transitions from an active to inactive state). To elaborate, when a valve is located a significant distance from the spray bar with which the valve is associated, there will need to be a water line that extends from the valve to the spray bar. If the water in this line drains into the spray bar after the valve is closed, the time needed for the spray bar to transition from an active to inactive state will increase. Similarly, if the water drains from the line when the spray bar transitions from an active to inactive state, the line will need to be recharged when the spray bar transitions from the inactive state to the active state. This recharging will increase the time needed to transition the spray bar from an inactive to active state.

Continuing, the drained floor 72 preferably presents an outer or upper surface suitable for individuals to walk or run over while not presenting significant discontinuities that could cause an individual to fall or trip and providing adequate drainage of the water output by the array of spray bars 62 when the apparatus is in operation. An example of such a floor is a floor that has pavers with small open seams between the pavers that allow water to drain away from the tops of the pavers. The water collected by the floor 72 can, depending on the situation, be returned to the water source 66 or discarded. In certain situations, it may be possible to forego the drained floor 72. For example, if the array of spray bars 62 is suspended over a beach or other natural surface that has adequate drainage, the drained floor 72 may be unnecessary. Further, if the array of spray bars 62 is located over a shallow pool, there is no need for the drained floor. In this case, the water produced by the array of spray bars 62 falls into the pool and is processed by whatever water circulation and/or filtration system is associated with the pool.

The assembly of the array of spray bars 62 and the suspending of the array from the overhead support 64 is or can be facilitated by using modules that each includes a number of spray bars connected to one another. With reference to FIGS. 6A-6D, an embodiment of a module 150 is described. The module 150 is comprised of twelve spray bars 152A-152L, a sub-water manifold 154 with an inlet port 156 for receiving water and twelve outlet ports 158A-158L, twelve valves 160A-160L with each valve associated with one of the twelve spray bars 152A-152L and each valve used to control the application of water from the sub-water manifold 154 to the spray bar with which the valve is associated, twelve water lines 162A-162L with each line extending from one of the outlet ports 158A-158L of the sub-water manifold 154 to one of the valves 160A-160L, a pneumatic manifold 164 with an inlet (not shown) for receiving air and twelve outlets (not shown) that are each associated with a pneumatic line that engages the pilot valve 128 associated with one of the valves 160A-160L, and nine spray bar connectors 166A-166I that each connect an end of at least two and no more than four of the spray bars 152A-152L to one another. The overhead connecting surface 118 that is associated with each of the spray bar connectors 166A-166I is available for use in suspending the module 150 from the overhead support. Typically, the sub-water manifold 154 is also suspended from the overhead support by a separate mechanism.

Continuing, the module 150 is a fully populated module because the module 150 has twelve spray bars, the maximum number of spray bars for a 2×2 grid-type module. Underpopulated 2×2 modules, (i.e., a modules with as few as four spray bars and no more than eleven spray bars (i.e., an under-populated module) are built to take into account the other module or modules to which the under-populated module is to be joined. For example, an under-populated module that has four spray bars corresponding to the 152I-152L spray bars of the module 150 can be built with a view to connecting the module to four other modules with one of these four modules providing what would be spray bars 152A, 152B in the module 150, a second of these four modules providing what would be spray bars 152C, 152D in the module 150, a third of these four modules providing what would be spray bars 152E, 152F in the module 150, and the fourth of the four modules providing what would be spray bars 152G, 152H in the module 150. The sub-water manifold employed with an under-populated module is the sub-water manifold 154 with the unused outlet ports plugged.

An example of the joining of a fully populated module with other under-populated modules is illustrated in FIG. 7. In FIG. 7, four 2×2 modules 180A-180D are joined together to form a large array of spray bars. The module 180A is the only fully populated module, as can be seen by a water line extending from each of the twelve outlet ports of the sub-water manifold. The sub-water manifold associated with each of the other modules 180B-180D has at least two unused/plugged outlet ports, indicating that module was assembled as an under-populated module.

Continuing, FIG. 8 illustrates two modules 184A, 184B each suspended from and overhead support 186. The modules 184A, 184B are suspended from the overhead support 186 using all-thread rods 188 that extend between the overhead support 186 and several of the spray bar connectors associated with the two modules. The use of all-thread rods allows the distance from each of the spray bar connectors to the overhead support 186 or to the underlying surface to be adjusted. In this regard, the all-thread rods can be used to level a module or to place a module out of level. Placing a module out of level will cause any spray bars that are activated in the module to output a wall of falling water droplets that, when the wall is first being created, "wipes" across the spray bar, i.e., the streams of water discharged from the spray bar do not start substantially at the same time as with a level spray bar but commence at one of the spray bar and progress towards the other end of the spray bar.

Continuing, in addition, the sub-water manifolds 190A, 190B are also suspended from the overhead support 186 by one or more connector 192. It should be appreciated that the system for supplying water to the spray bars associated with the two modules 184A, 184B is located above the spray bars. As such, the use of upright structures to provide water to the modules 184A, 184B within the shadow of the spray bars is avoided.

A module can be smaller or larger than the 2×2 module 150. The smallest module is comprised of two spray bars connected to one another. However, the smallest module likely to be used in practice is comprised of four spray bars that are connected to one another so as to form a square. A larger module could be a 2×3 module. However, larger modules that are likely to be most used in practice are n×n modules, e.g. 3×3 and 4×4 modules. For modules that are used to produce regular polygons of different shapes (e.g., an equilateral triangle or pentagon), the smallest module likely to be used in practice is comprised of the minimum number of spray bars needed to form a single regular polygon (e.g., a single equilateral triangle or a single pentagon). Larger modules, in this case, comprise two or more of these regular polygons.

Figure 9:
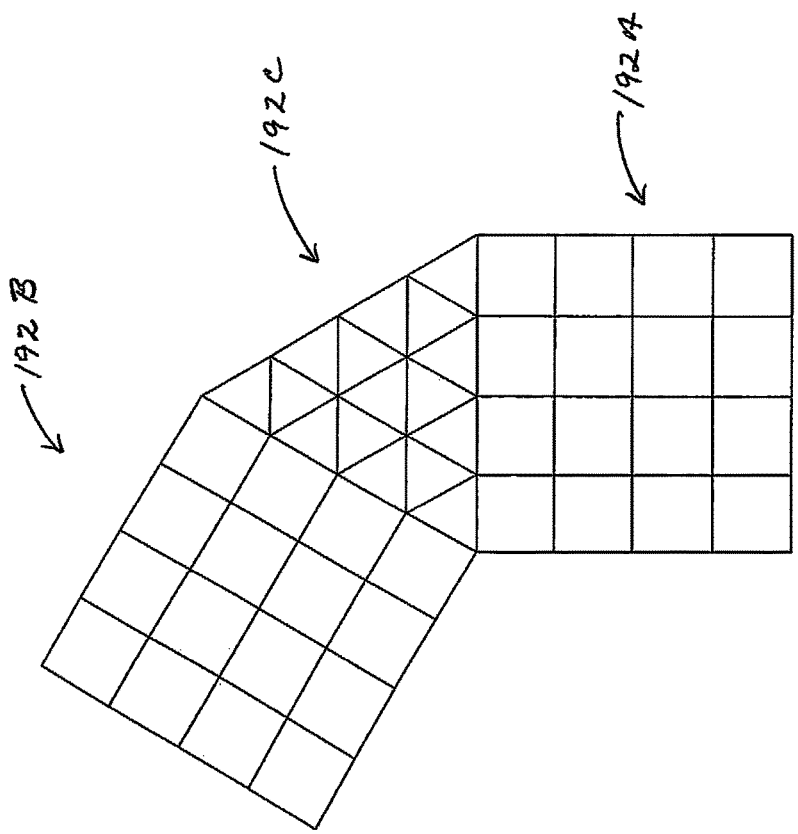
FIG. 9 illustrates a spray bar array comprised of two "square" modules and one equilateral module in the prior art.

Continuing, FIG. 9 illustrates the use of a first 4×4 module 192A, second 4×4 module 192B, and an equilateral triangle module 192C to realize a spray bar array that has an overall shape that is neither a square nor an equilateral triangle. As such, it should be appreciated that modules with different shapes can be used to produce spray bars arrays of varied overall shapes. This, in turn, allows an array of spray bars to be constructed that can fit within areas having unusual or constrained shapes.

It should be appreciated that modules can be constructed without a sub-water manifold. For such a module, a separate water line must be run from the water source to each of the spray bars in the module when the module is integrated into the array of spray bars. For large arrays of spray bars comprised of multiple modules, the running of a separate line from the water source to each spray bar typically becomes quite cumbersome. In such cases, the use of a sub-water manifold with each or a substantial number of the modules being used to construct the array of spray bars typically is significantly less cumbersome.

Continuing, a module can be constructed without a sub-water manifold and without one or more valves attached to each of the spray bars in the module. This may be appropriate when all or a portion of the array of valves 68 is going to be located a significant distance from the array of spray bars. For such a module, a separate water line must be run from the valve or valves that are associated with a particular spray bar to the particular spray bar for each of the spray bars in the module. The running of separate water lines to each spray bar in a module typically becomes increasingly cumbersome as the array of spray bars becomes larger and larger. The incorporation of a sub-water manifold and valves into a module typically renders the construction of the array of spray bars less cumbersome.

A module can also be constructed without a pneumatic manifold and a separate air line can be run from the source of compressed air to each valve in the module. This can also become quite cumbersome, particularly for large arrays of spray bars. The use of a pneumatic manifold with each or a substantial number of the modules typically is much less cumbersome.

Continuing, the components needed to construct an array of spray bars in which multiple spray bars are joined to one another and an array of valves for controlling the flow of water to the array of spray bars can be provided in a kit form. In one embodiment, the kit includes a plurality of substantially identical spray bars that are not connected to one another, a plurality of substantially identical spray bar connectors for connecting spray bars to one another, and a plurality of substantially identical valves with each valve capable of being associated with only one spray bar. In another embodiment, the kit includes multiple modules with each module being a combination of spray bars, spray bar connectors, and valves.

Continuing, for example, in one embodiment, the kit includes a number of modules with each module having a plurality of spray bars connected to one another by spray bar connectors. This embodiment of the kit also includes a plurality of valves that are substantially identical to one another. In another embodiment, the kit includes a number of modules with each module having a spray bar and one or more valves attached to each spray bar. This embodiment of the kit also includes a plurality of spray bar connectors.

The ability of the apparatus 60 to produce numerous and/or changing walls of falling water droplets that can be used to create translucent projection screens allows the apparatus to be used to create light/display shows with interesting visual effects. With reference to FIG. 10, an example of the use of the apparatus 60 to produce a light show is described. In FIG. 10, the array of valves has been used to activate the spray bars in the array of spray bars 62 needed to produce three translucent screens 194A-194C and to deactivate all of the other spray bars in the array of spray bars 62. A projector 196 is used to project an image on the translucent screens 194A-194C. Preferably, the projector 196 is a digital-light-projector (DLP) that can project a focused image over a considerable range without requiring adjustment.

Continuing, other types of projectors can be utilized. However, a projector that is more constrained as to the range over which a focused image can be produced may, to the extent focused images are needed or desired, constrain the locations of the screens upon which light or an image can be projected at a particular point in time. Changing screens may require adjustment of the focus. If the projector allows for computer controlled focusing, this refocusing can be done by the controller 70 in coordination with the changing of the screens. Due to the difference in distances between the projector 196 and the three screens 194A-194C, the image is of a different size on each of the screens.

As can be appreciated, the array of valves 68 can also be used to sequence the screens 194A-194C such that the projected image appears to move. More specifically, the array of valves can be used to "turn on" the screen 194A and "turn off" screens 194B-194C, thereby resulting in the image being projected only on screen 194A. Subsequently, the array of valves 68 can be used to turn off screen 194A, turn on screen 194C, and keep screen 194B turned off. The image would then appear to have jumped from screen 194A to screen 194C and increased in size. Subsequently, the array of valves can be used to turn off screen 194C, turn on screen 194B, and keep screen 194A turned off. The image would then appear to have jumped from screen 194C to screen 194B and decreased in size.

Continuing, numerous other variations involving the use of the array of valves 68 to turn on and turn off translucent water screens are feasible. For example, the array of valves 68 can be used to turn on or turn off a screen in a manner that is coordinated with the image being produced by the projector. For instance, the array of valves 68 could be used to establish only screen 194B to receive a first image being projected by the projector. Subsequently, the array of valves could be used to turn off screen 194B and turn on screen 194C to receive a second image that is different than the first image. The use of multiple projectors and the coordination of the images produced by the projectors with the turning on and turning off of screens by the array of valves 68 is also feasible. Typically, the controller 70 would be programmed to coordinate the operation of the array of valves 68 in turning on and turning off screens with the image or images being projected by the projector or projectors.

Figure 12B:
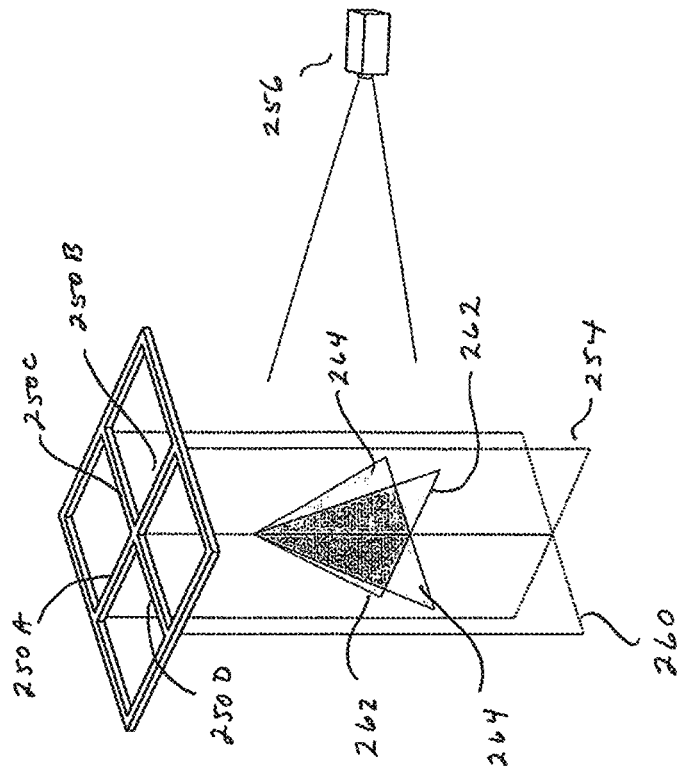
FIGS. 12A-12B illustrate the use of the apparatus of FIGS. 11A-11B to produce a volumetric image in the prior art.
Figure 12A:
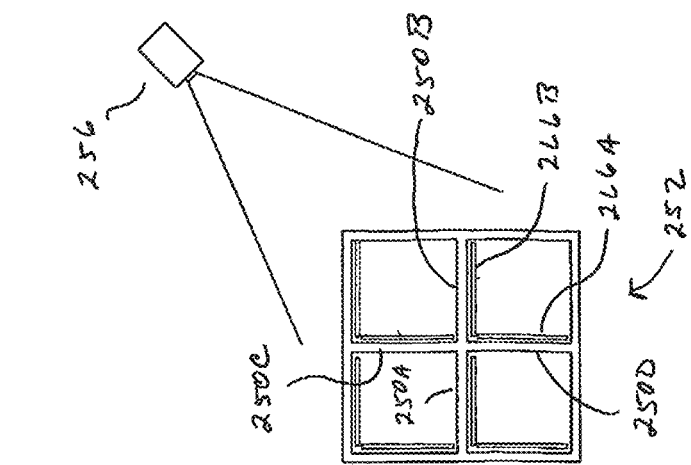

Continuing, with reference to FIGS. 11A-11B and 12A-12B, the apparatus 60 can also be used with a projector to produce "volumetric" images. To elaborate, FIGS. 11A-11B illustrate the use of two spray bars 250A, 250B in a 2×2 array of spray bars 252 to produce a planar screen 254. A projector 256 is used to project a triangle image 258 on the screen 254. FIGS. 12A-12B illustrate the use of the spray bars 250A, 250B to produce the planar screen 254 and the use of the spray bars 250C, 250D to produce a second planar screen 260 that is substantially perpendicular to the screen 254. Further, the projector 256 is positioned so as to, in effect, project a first triangle image 262 on to the screen 254 and a second triangle image 264 on to the second screen 260. Due to the screens intersecting one another, the image seen by a spectator has a volumetric characteristic, i.e., the image is volumetric and can perhaps be characterized as three-dimensional.

It should be appreciated that this effect is not constrained to screens that are perpendicular to one another. Consequently, arrays of spray bars that are laid out in other than a grid-like pattern can also be used to practice this effect. Additionally, more than two screens can be used to further enhance this effect if the array of spray is capable of being used to create three or more intersecting screens or multiple screens associated with multiple modules.

Continuing, with references to FIGS. 11A and 12A, a pair of down directed lighting strips 266A, 266B is associated with two of the four spray bars that make up a single square of spray bars in the 2×2 array of spray bars 252. Each of the lighting strips 266A, 266B can be turned "on" or "off" by the controller 70. When a lighting strip is in the "on" state, whatever color of light is being output by the light is directed so as to engage any wall of falling water droplets that is being produced by the spray bar with which the light strip is associated. The lighting strips are low voltage and low current lighting strips. In the illustrated embodiment, the lighting strips are LED lighting strips manufactured by Traxon. Each of the lighting strips can be of a type that outputs a single color of light or of a type that can selectively output different colors of light.

Two light strips are associated with each square of the 2×2 array of spray bars 252. As such, four of the exterior spray bars of the array 252 are not associated with a lighting strip. Each of these four exterior spray bars will, however, be associated with a light strip when the array is connected to two, similar 2×2 arrays. Certainly, if the array 252 was located at the edge of the overall array of spray bars and light strips were not associated with one or more of the exterior spray bars of the array 252, light strips could be associated with any such exterior spray bars.

Continuing with reference to FIG. 10, the overhead support 64 has been adapted so as to serve as a surface from which the array of spray bars 62 can be suspended and to also serve as a water manifold for distributing water to the spray bars and a pneumatic manifold for distributing air to the valves. As such, the overhead support 64 avoids the need for one or more pneumatic manifolds 142 and one or more sub-water manifolds 154. With reference to FIGS. 13A-13C, the overhead support 64 can be realized using combinations of one or more of each of a first component 210A, a second component 210B, and a third component 210C. Characteristic of each of the components 210A-210C respectively is an upper pipe structure 212A-212C for carrying air, a lower pipe structure 214A-214C for carrying water, and a truss or connector 216A-216C for connecting the upper pipe structure to the lower pipe structure.

Eight flanges are associated with each of the components, four with the upper pipe structure and four with the lower pipe structure. The flanges facilitate the connection of components to one another to realize the overhead structure and the distribution manifolds. One or more of the flanges associated with the upper pipe structures of the support 64 is/are connected to a source of compressed air. Similarly, one or more of the flanges associated with the lower pipe structures of the support 64 is/are connected to a source of water. Typically, several of the flanges associated with each of the resulting upper and lower pipe structures of the support 64 are connected to a cap that seals the end of the relevant pipe. The longer portions of the upper and lower pipe structures of the components 210A, 210B have ports that respectively allow air and water to be distributed to the valves and spray bars.

Continuing, each of the components 210A-210C also respectively includes a connector surface 218A-218C for engaging a connecting device that also engages the overhead connector surface 118 of one of the bracket systems 100. FIG. 14 illustrates a pair of spray bars 220A, 220B that are connected to one another by one of the bracket systems 100 suspended from the first component 210A by a connector 222 that engages the overhead connector surface 118 of the bracket system and the connector surface 218A of the first component 210A.

Figure 15:
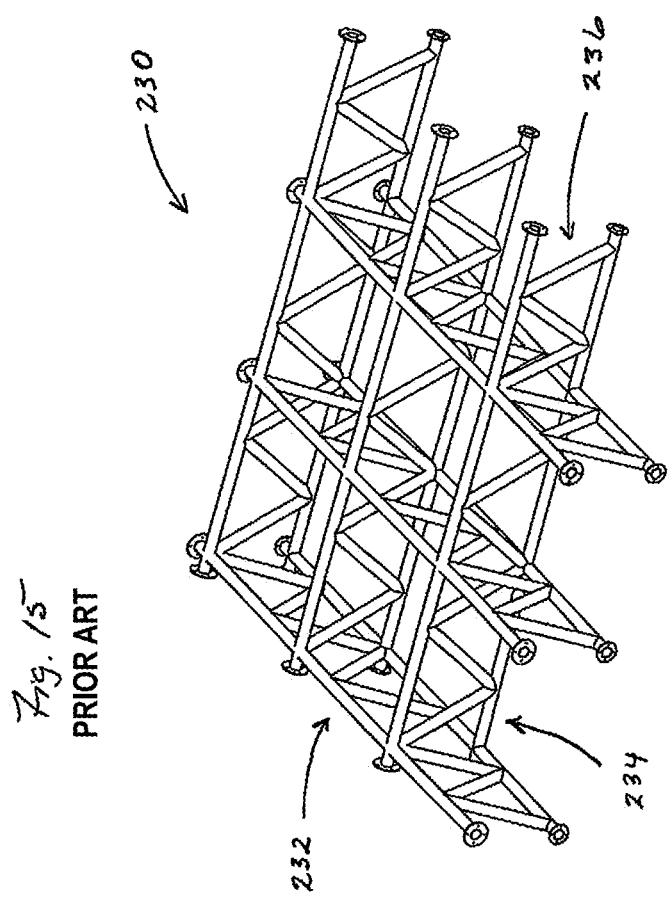
FIG. 15 illustrates a modular structure for the overhead support in the prior art.

Continuing, with reference to FIG. 15, the overhead support 64 can also be realized by a structure 230 that has an upper pipe array 232 for carrying air, a lower pipe array 234 for carrying water, and truss structure 236 connecting the upper pipe array 232 and the lower pipe array 234. The structure 230 respectively provides a 2×2 array of spray bars and associated valves with water and air. A comparable structure comprised of the components 210A-210C that require numerous connections to be made between the components. Consequently, the structure 230 generally speeds the construction of the apparatus. Nonetheless, if needed, the structure 230 can be connected to any of the components 210A-210C if needed.

Using FIGS. 16-28, we will now describe the present disclosure.

As may be appreciated, based on the disclosure, there exists a need in the art for simplifying the design and construction of an apparatus for producing reconfigurable walls of falling water droplets. Further, there exists a need in the art for accommodating non-standard connection angles between wall sections. Additionally, there exists a need in the art for a crisp and simultaneous discharge of water droplets across each wall section, and a need to provide a sufficient volume of falling water to capture a projected image. Also, there exists a need in the art for a continuity of falling water across connector portions of an array of adjoining wall sections.

Referring now to FIGS. 16-28, in an embodiment, an apparatus for producing a wall of falling water droplets may include a plurality of tubular integral spray bars 310, each spray bar 310 extending from one end 311 to an opposite end 311. The wall 254 depicted in FIG. 11b may represent one embodiment of two activated spray bars 310. The spray bars 310 may be of a single-tube structure (and which may be referred to as a manifold), as show in FIG. 18-19, distinct from the spray bar 80 discussed hereinabove in FIGS. 3a-3e. Each of the spray bars 310 may include a water inlet 316 for receiving pressurized water from a water source (not shown) near the apparatus. A series of output holes 318 (FIGS. 16, 22) may extend along a length of the spray bar 310 through which the received pressurized water is dischargeable to produce the falling water droplets.

Figure 16:
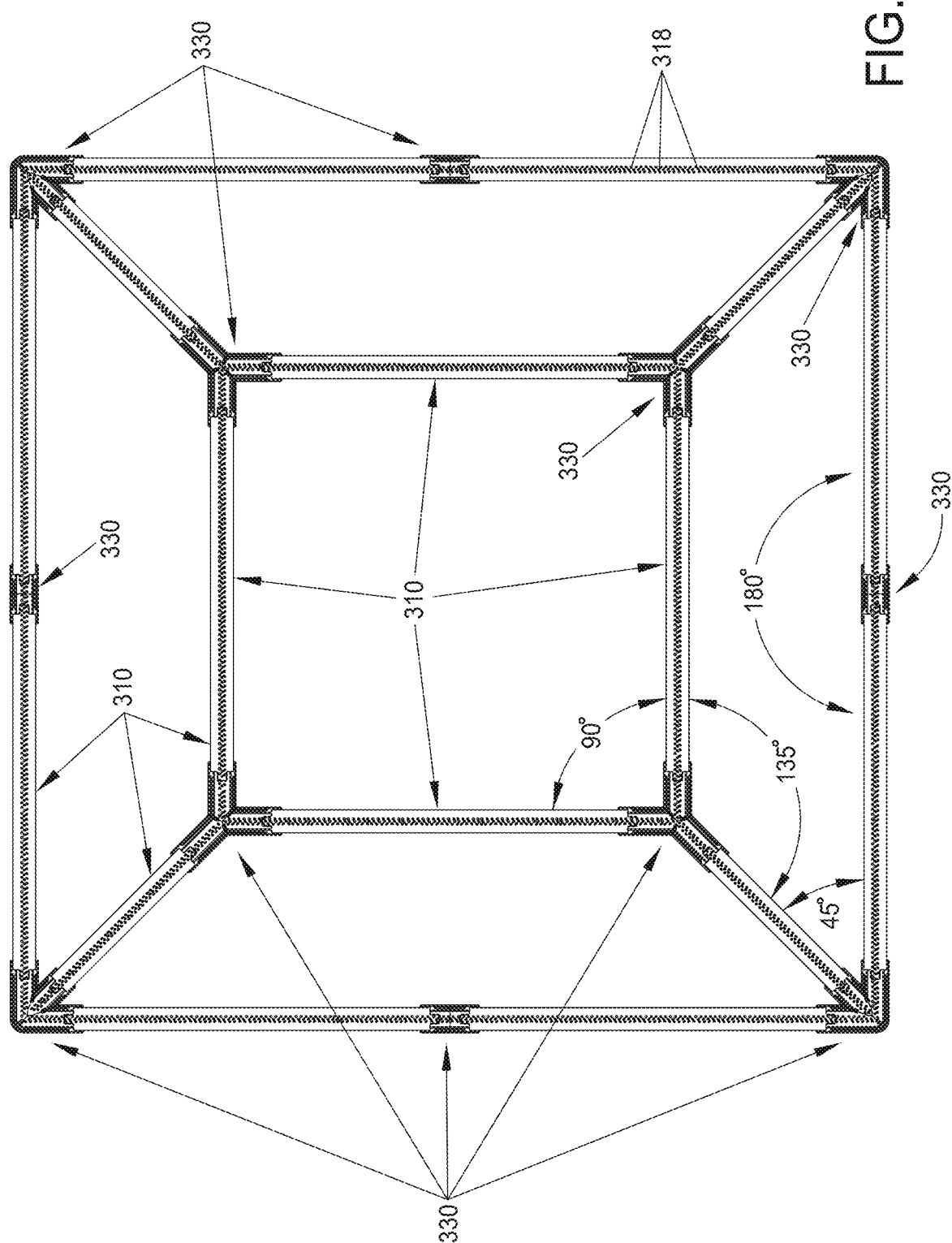
FIG. 16 illustrates a bottom view of an array of spray bars in an apparatus for producing a wall of falling water droplets, in accordance with an embodiment of the present disclosure.
Figure 17:
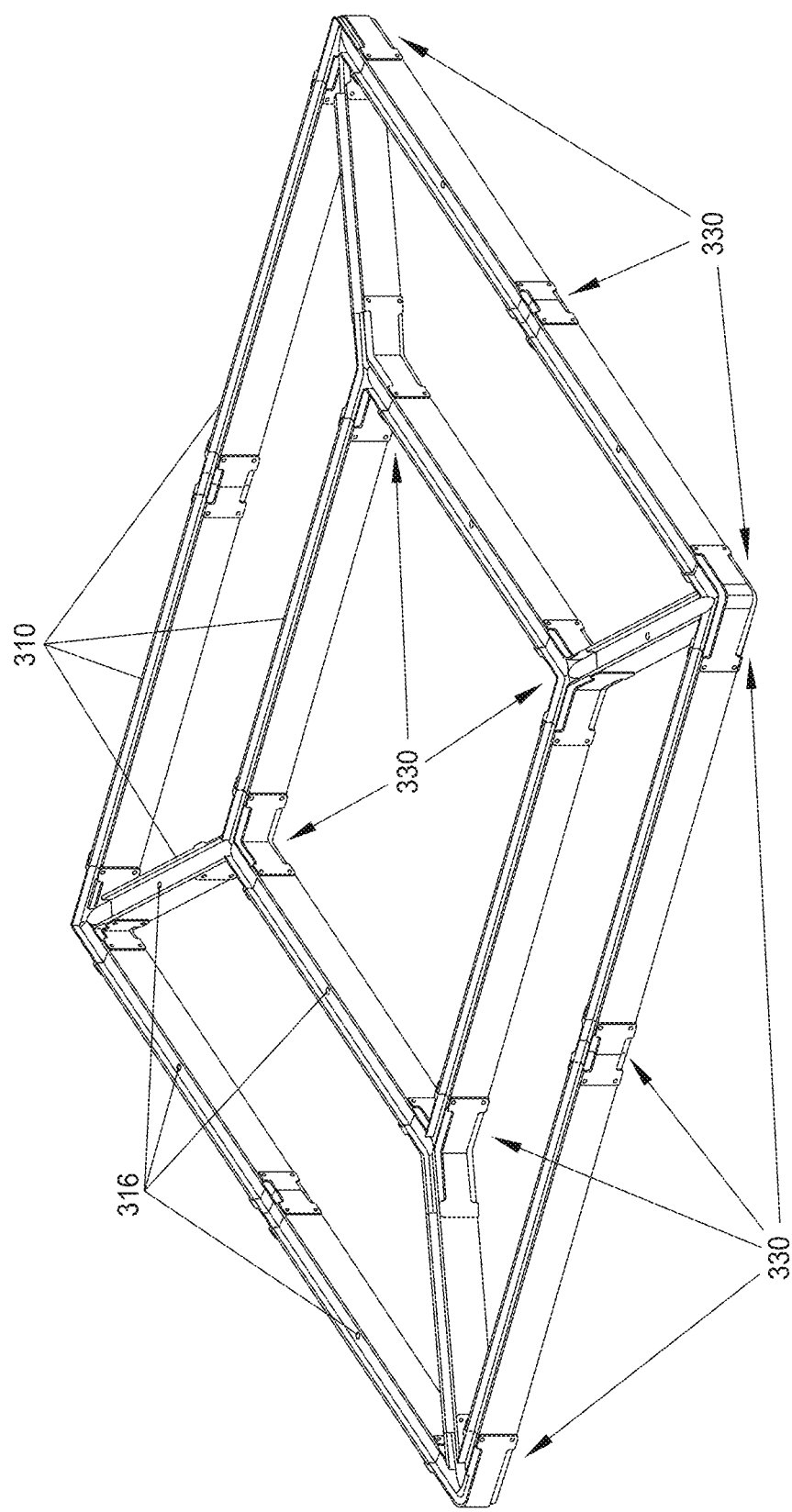
FIG. 17 illustrates an isometric top view of the array of spray bars of FIG. 16, in accordance with an embodiment of the present disclosure.
Figure 19:
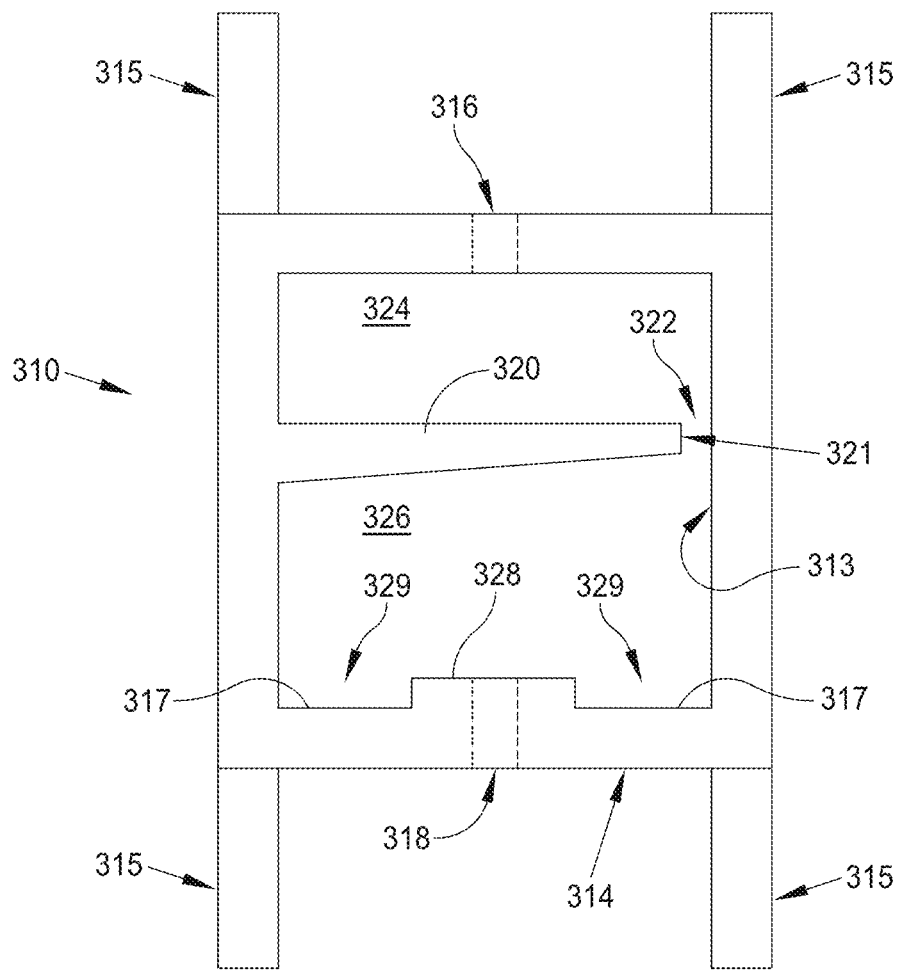
FIG. 19 illustrates a cross-sectional view of the spray bar of FIG. 18, in accordance with an embodiment of the present disclosure.

The series of outlet holes 318 may preferably be disposed on a bottom side 314 of the spray bars 310 for discharging the wall of droplets toward a drained floor, as shown in FIG. 16. The outlet holes 318 may be one or multiple rows of small holes evenly spaced and sufficient for establishing a section of the wall (or rain curtain). The water inlet 316 may preferably be centered on a top portion, as shown in FIGS. 17 and 19, or may be located on a side of the spray bar 310. A water pressure of the water source, a diameter of the spray bar 310, and a size and number of the outlet holes 318 may be adjusted for an optimum rain curtain.

Continuing with FIGS. 16-28, in an embodiment, the apparatus may include a plurality of connectors 330, each one configured to join together a free end 311 of one spray bar 310 with a free end 311 of at least one other spray bar 310. The plurality of connectors 330 and the plurality of spray bars 310 may be assembled into a geometric design of spray bars 310 having one or more vertices, as shown FIGS. 16-17. Each vertex in the design may impose various horizontal angles between each adjacent pair of spray bars 310 connected therein. Connector 330 may be an N-way connector configured to join N spray bars 310 at various horizontal angles (FIGS. 16, 20, 23, 26), where N may range from two to eight. The horizontal angles may range from less than 30° to more than 330°. The N-way connector 330 may also provide a water cap (not shown) for sealing an interior volume of each of the N spray bars joinable at the vertex.

Referring to FIGS. 16-17, the N-way connectors 330 and the N spray bars 310 joining together may be configured relative to one another to make substantially seamless the discharge of droplets across the N-way connector 330. The N-way connector 330 may include one or more passthroughs 338 alignable with at least some of the series of outlet holes 318 for making continuous the wall of falling water droplets. Each N-way connector may be formed by an angle-specific 3D-printing process or an injection molding process. By being able to program unique horizontal angles into the instruction set of the 3D printer, a greater flexibility may be had in creating the dimensions and array geometry than the time-consuming process of machining or fabricating a casting. A more preferred embodiment of the connector is presented below.

Figure 18:
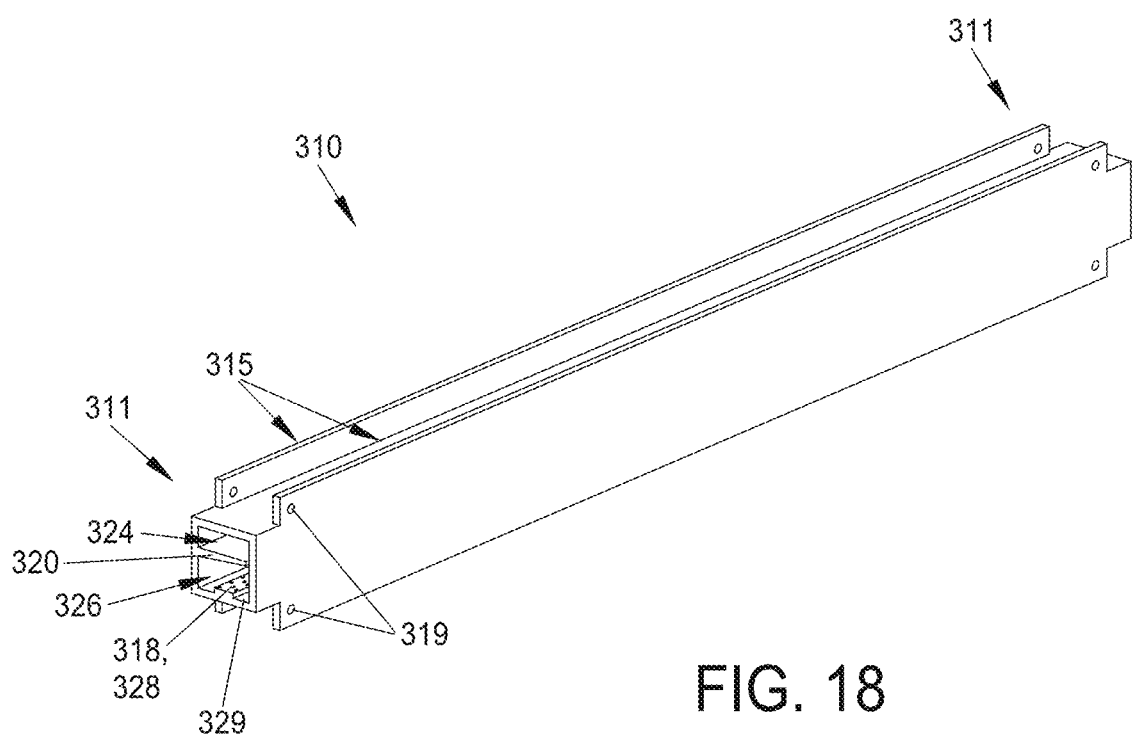
FIG. 18 illustrates a isometric view of one of the spray bars in an apparatus for producing a wall of falling water droplets, in accordance with an embodiment of the present disclosure.

Referring to FIGS. 18-19, in an embodiment, the spray bar 310 may include a flow regulator disposed interiorly between the water inlet 316 and the series of outlet holes 318. The flow regulator may be configured to spread the inlet water evenly along the length of the spray bar 310 prior to the discharging, and may thereby induce a simultaneous delivery of water droplets across the series of outlet holes 318. The flow regulator may comprise a flow regulating shelf 320 integral to the spray bar 310, where the shelf 320 may partially bisect an interior volume of the spray bar 310 into an inlet interior 324 and an outlet interior 326. In a preferred embodiment, the water inlet 316 may be directly conductive to the inlet interior 324, and the outlet interior 326 may be directly conductive to the series of outlet holes 318. The regulator may further include a flow passageway 322 for inviting resistive flow between an edge 321 of the shelf 320 and an inner surface 313 of the spray bar 310, and from the inlet interior 324 to the outlet interior 326.

In another embodiment (not shown), the flow regulator may comprise dividing the interior volume of each spray bar 310 with a porous shelf (not shown) separating the inlet interior 324 from the outlet interior 326. For example, one or more holes, slots, or baffles may be configured within the interior volume for establishing porosity and resistive flow from the inlet interior 324 to the outlet interior 326. Additionally, a cross-sectional shape and positioning of the shelf may be adjusted in order to expand or contract a volume of the inlet interior 324 or to control the resistive flow. Beneficially, the internal shelf, whether partial or porous, may facilitate a more responsive start and stop of the rain curtain than without the shelf, and may create a controlled back pressure to force the inlet water to spread. The flow regulator may also minimize dripping when the spray bar 310 is deactivated.

Continuing with FIGS. 18-19, in an embodiment, a gutter system may be configured within each of the plurality of spray bars 310 for preventing debris in the interior volume of the spray bar 310 from reaching and possibly clogging the series of outlet holes 318. The gutter system may comprise a raised bed 328 containing the series of outlet holes 318 and positioned above a floor portion 317. The floor portion 317 may form one or more gutters 329 to one or both side of the outlet holes 318. The debris may arise from the process of fabricating the spray bar 310, from assembling the array, or be present in the water source. Gutters 329 may also regulate the flow of inlet water to, and discharge from, the outlet holes 318.

Referring still to FIGS. 18-19, in various embodiments, the spray bar 310 may be formed as a unified, integral piece by one or more of (1) extruding an extrusion material, (2) gluing together cut-flat material, and (3) injection molding. The flow regulating shelf 320, raised bed 328, and gutters 329, in addition to the inlet interior 324 and the outlet interior 326, may be configured in uniform cross-section, thereby facilitating the extrusion process. Alternatively, portions of the spray bar may be glued together to form an integral spray bar and, in a preferred embodiment, a uniform cross-section. In addition, ends 311 of the spray bar 310 may be open for continuing the uniform cross-section and being receivable by connector 330 at any trimmed length.

In one embodiment, the extrusion material may be a PVC material or another extrudable plastic. The extrusion manufacture may provide a superior degree of dimensional uniformity compared to hand building each rain curtain section out of off-the-shelf PVC piping and 90° connectors. Beneficially, a uniform cross-section may allow a one-piece spray bar 310 to be simply extruded or glued together at any desired length and without designing a casting or a machining process, thereby facilitating more freedom in designing the geometric array. Also, the uniform spray bar 310 may be manufactured in one or more standard lengths which are then trimmable to any lesser length without additional extrusion, molding, or gluing steps. The spray bar 310 may be perforated with the series of outlet holes 318, such as by drilling. Both the extrusion and trimmability features may reduce production costs/foot dramatically.

Referring now to FIGS. 20-28, in preferred embodiments, each of the N-way connectors 330 may comprises a connector portion 331 for each spray bar 310 joinable at the vertex. One end of each connector portion 331 may be configured to terminate one spray bar 310 and an opposite end may present a miter style joining surface 332 for stably meeting one or more other connector joining surfaces 332 at a shared vertex. The miter style joining surface 332 of each connector portion may be configured to accord with the horizontal angle required by adjacent spray bars 310 at the vertex. Connector mounting holes 339 and spray bar mounting holes 319 may be configured to fasten the connector portions 331 at a respective vertex in the array. Joining surface angles may be standardized so that mounting holes 339 and 319 align.

Figure 20:
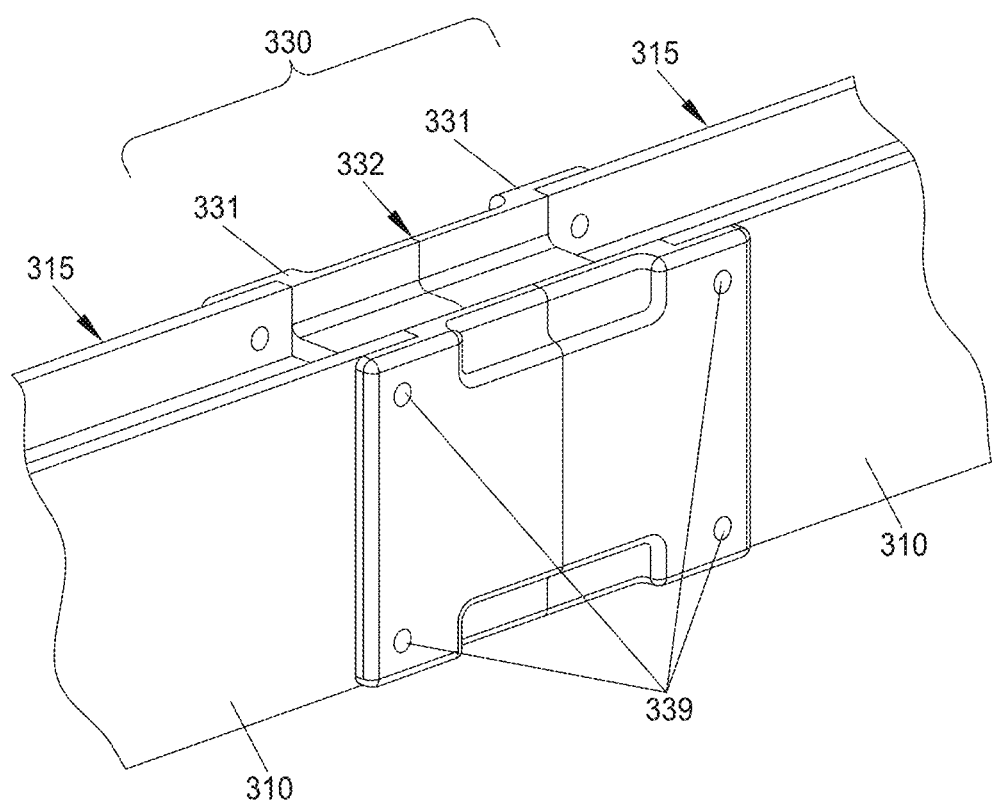
FIG. 20 illustrates an isometric side view of a straight connection of two spray bars in an apparatus for producing a wall of falling water droplets, in accordance with an embodiment of the present disclosure.
Figure 21:
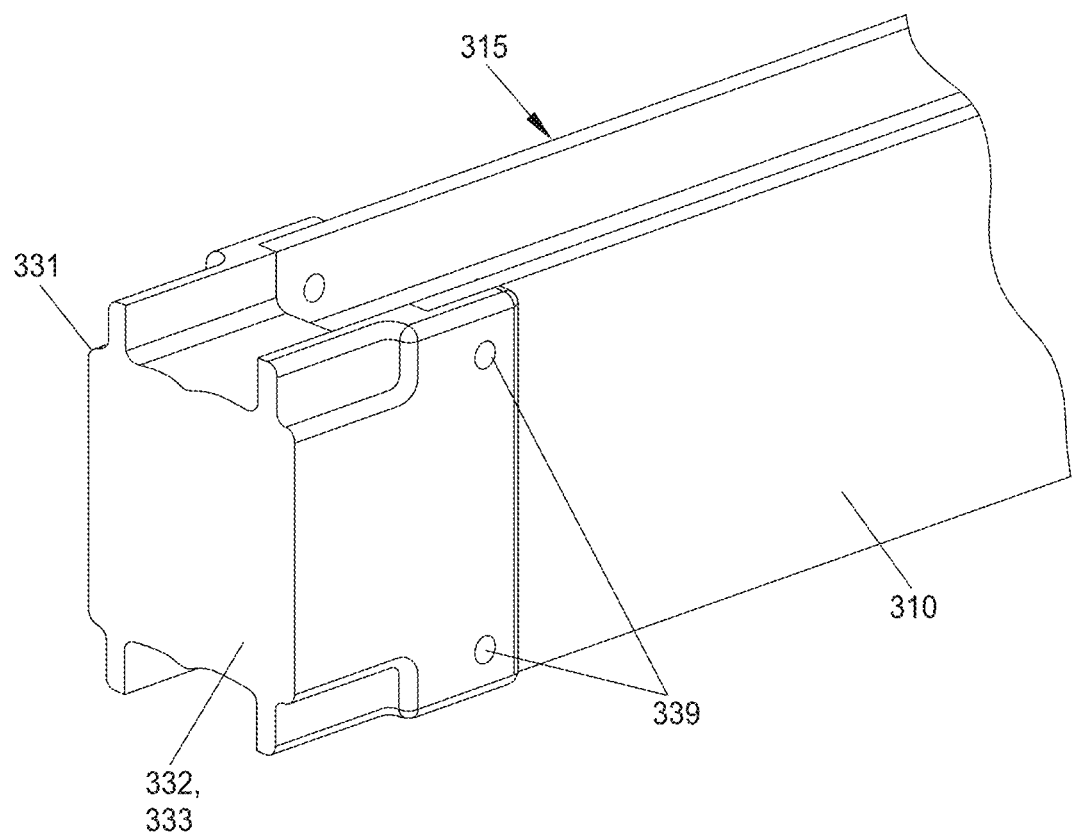
FIG. 21 illustrates an isometric side view of a connector portion terminating one of the spray bars of FIG. 20, in accordance with an embodiment of the present disclosure.
Figure 22:
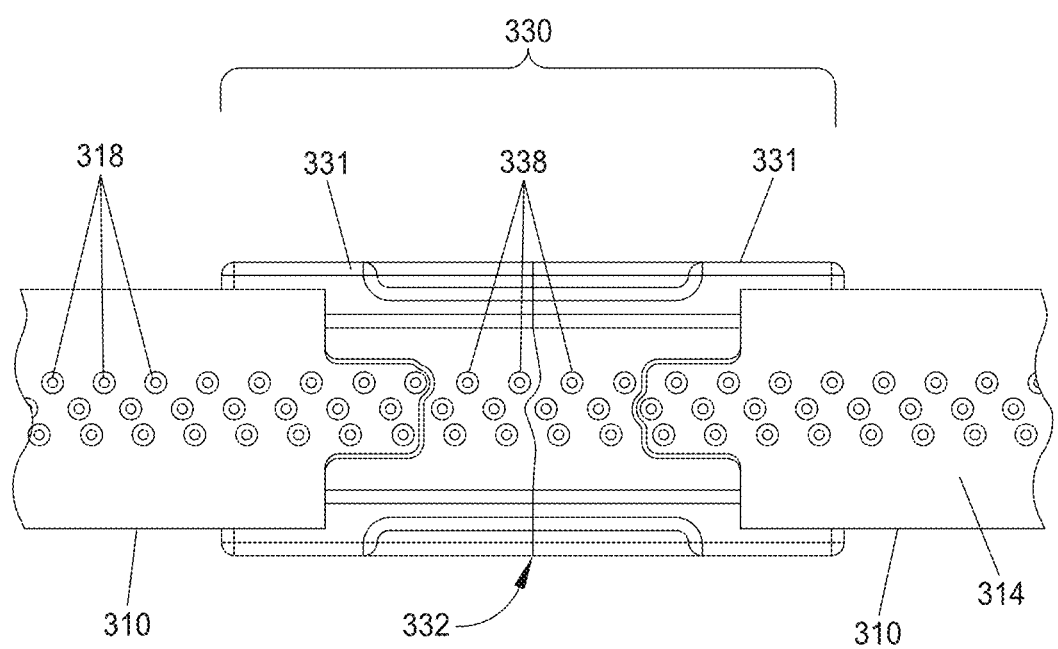
FIG. 22 illustrates a bottom view of the straight connector of FIG. 20 and showing a continuation of the series of outlet holes, in accordance with an embodiment of the present disclosure.
Figure 23:
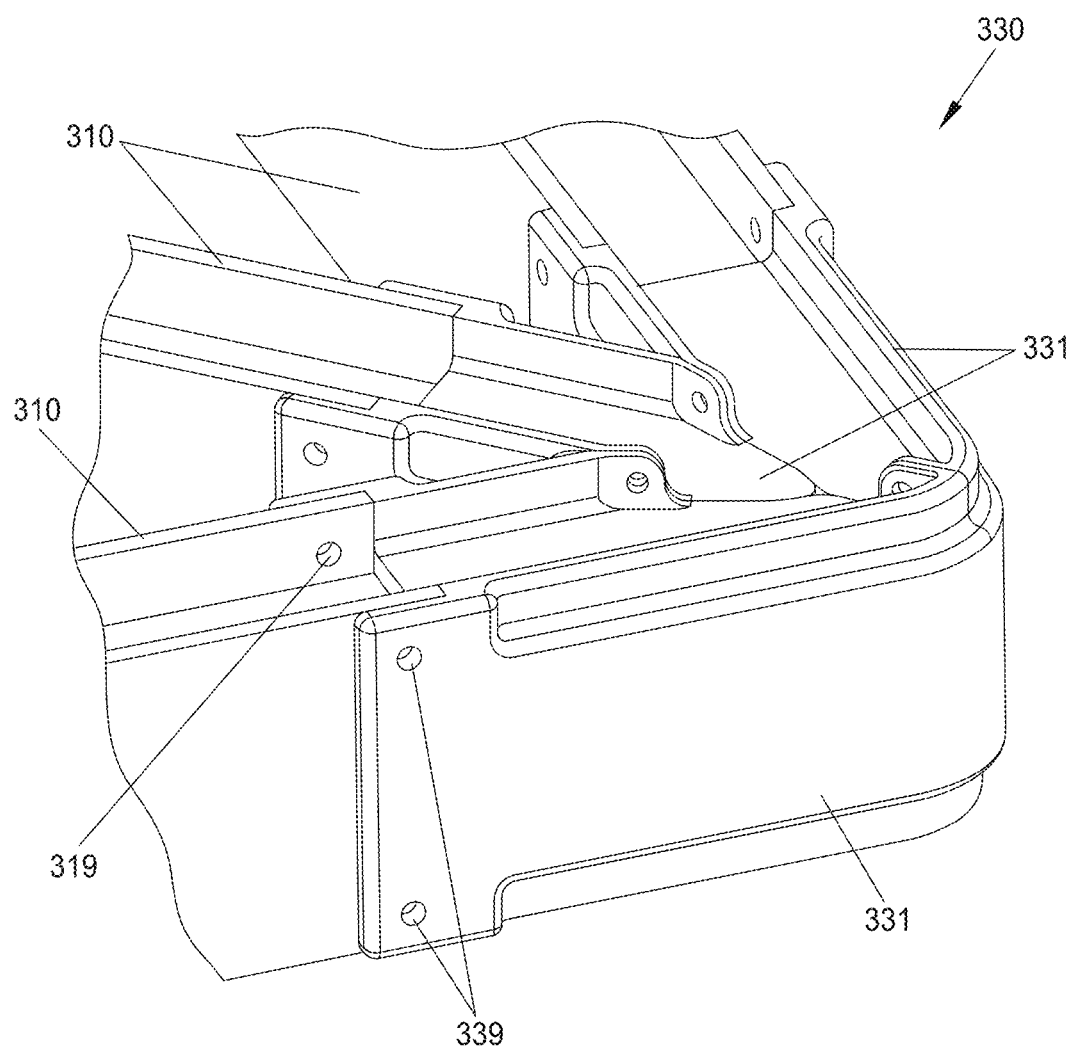
FIG. 23 illustrates an isometric view of three connector portions meeting at a corner in an apparatus for producing a wall of falling water droplets, in accordance with an embodiment of the present disclosure.
Figure 24:
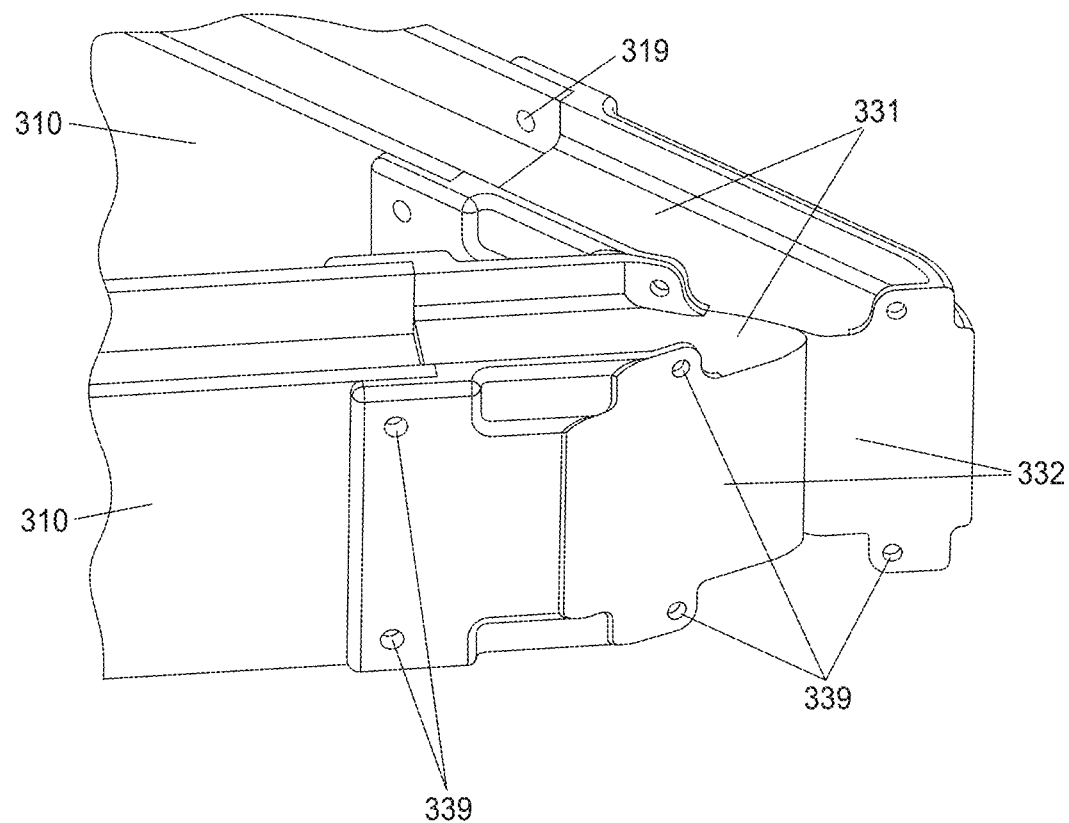
FIG. 24 illustrates an isometric view of two of the connector portions of the N=3 corner of FIG. 23, in accordance with an embodiment of the present disclosure.

Preferentially, the joining surfaces of each connector portion are miter-angled in a standardized way for also accommodating multiple geometric configurations which may be symmetrical or unsymmetrical. For example, the joining surface 332 for a straight 2-way meeting with one other connector portion 331 (180° horizontal angle) may need a joining surface 332 mitered at half that angle, or 90° with respect to an axis of the connector portion (FIGS. 20-22). And the joining surface 332 for a right angle equally-spaced 3-way meeting (45° horizontal angle) may need a joining surface 332 mitered at 22.5° with respect to an axis of the connector portion (FIGS. 23-25).

The joining surface 332 may also provide a water cap 333 for sealing the interior of the terminated spray bar joinable at the vertex, particularly if the spray bar end 311 is an open end. The apparatus may further include an end cap (not shown) for water sealing any un-connectorized spray bar ends 311 in the array.

Figure 25:
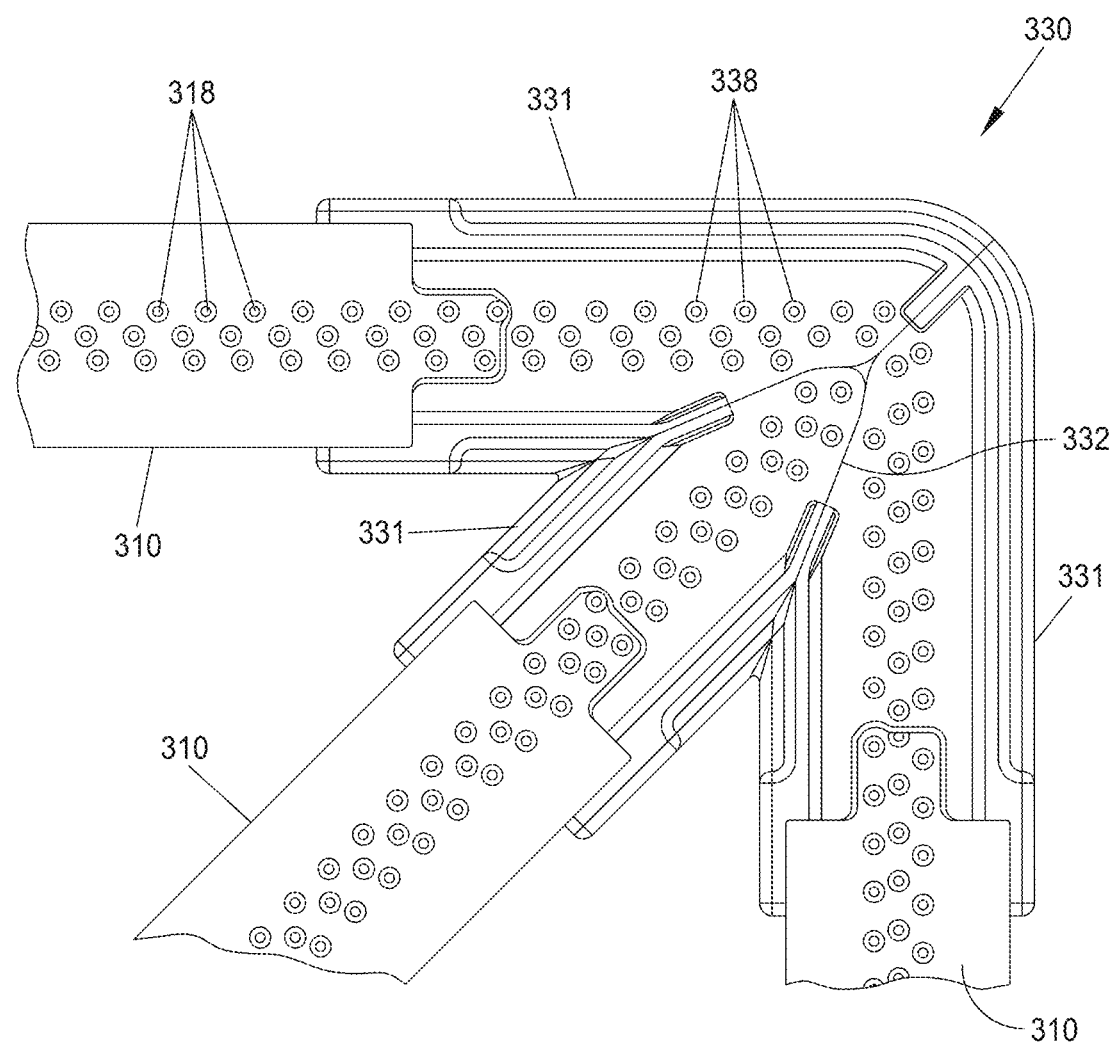
FIG. 25 illustrates an bottom view of the corner connection of FIG. 23, in accordance with an embodiment of the present disclosure.
Figure 26:
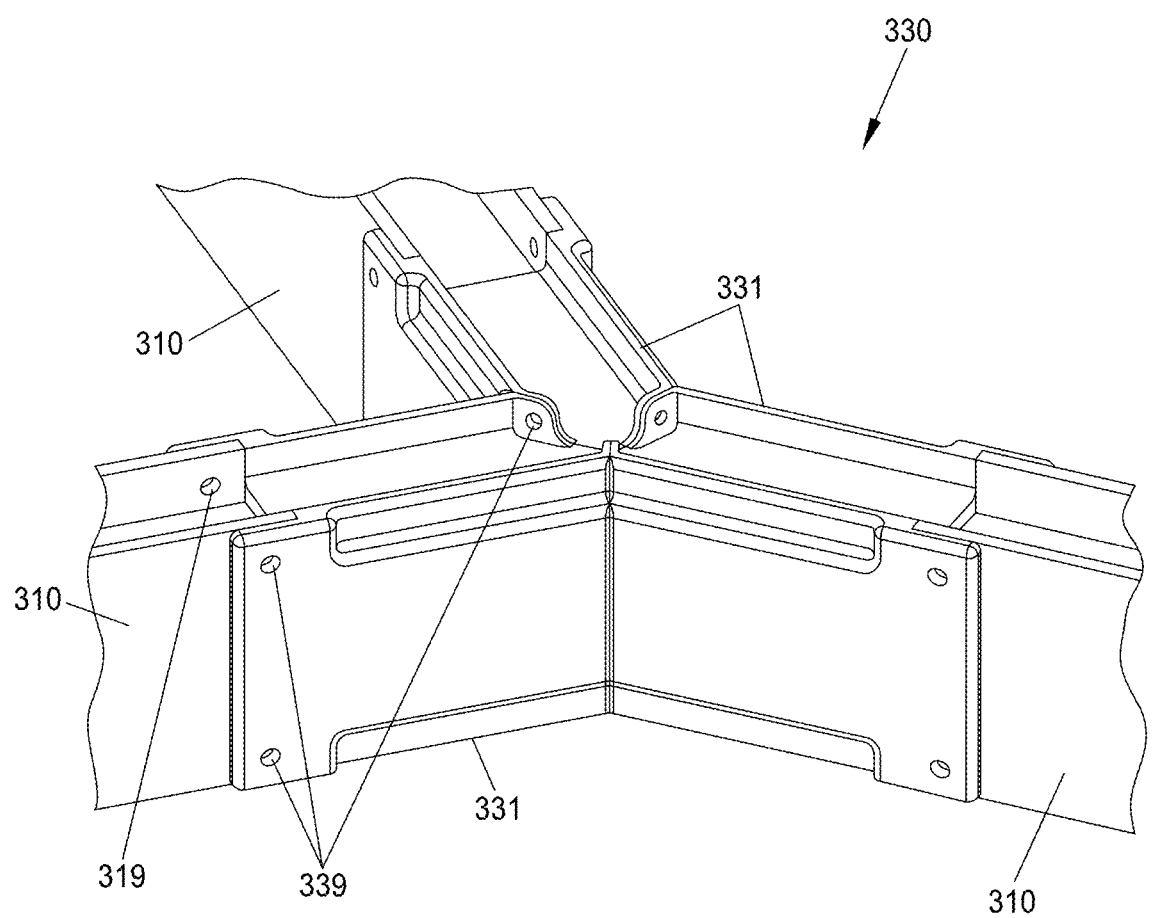
FIG. 26 illustrates an isometric view of a 3-way Y-connection in an apparatus for producing a wall of falling water droplets, in accordance with an embodiment of the present disclosure.
Figure 27:
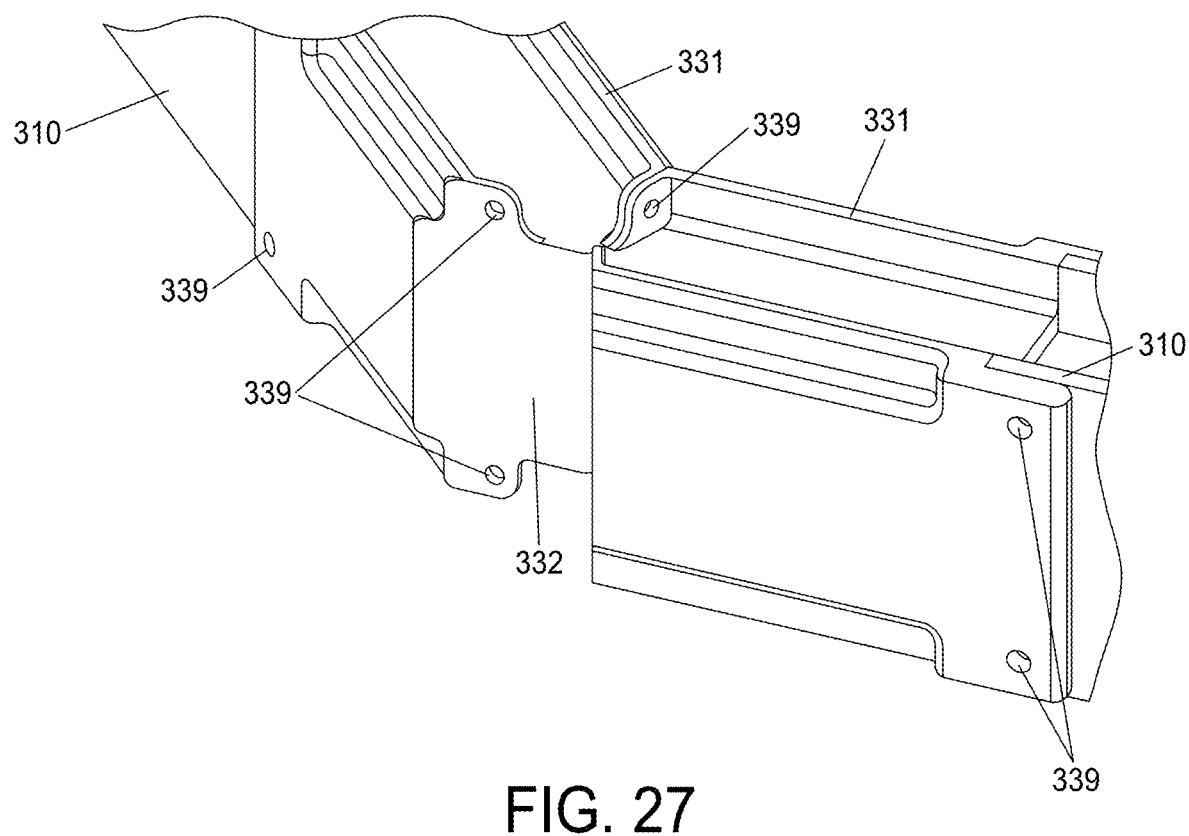
FIG. 27 illustrates an isometric view of two of the connector portions of the N=3 corner of FIG. 26, in accordance with an embodiment of the present disclosure.
Figure 28:
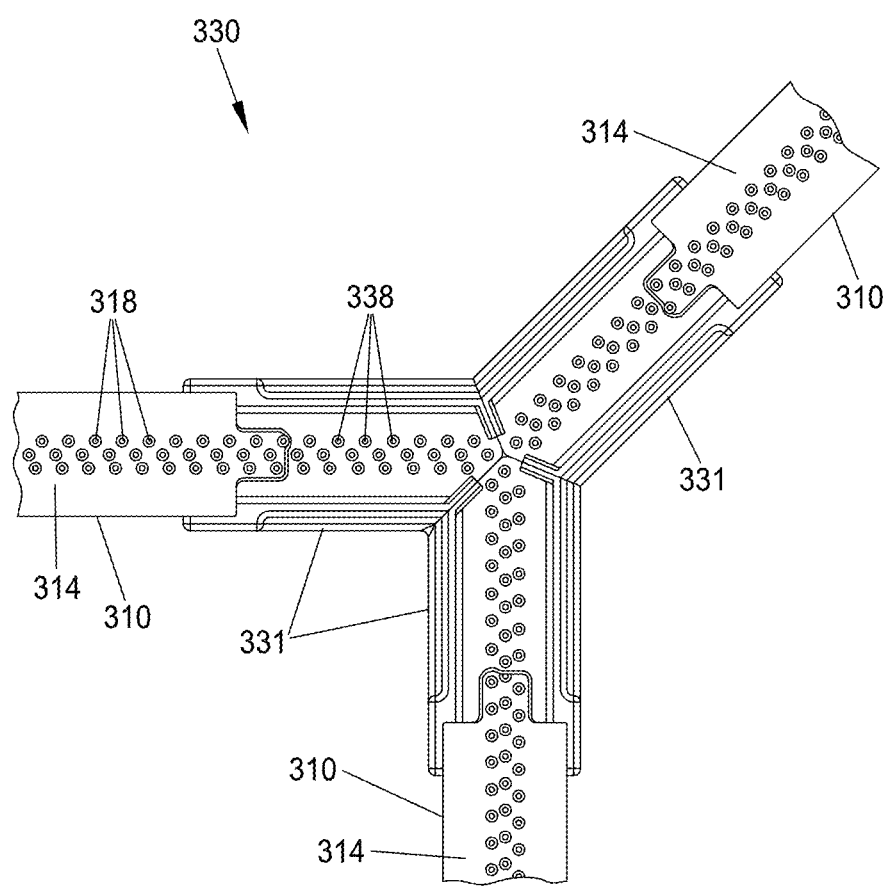
FIG. 28 illustrates a bottom view of the 3-way Y-connection of FIG. 26, in accordance with an embodiment of the present disclosure.

Continuing with FIGS. 18-28, in an embodiment, the connector portion 331 may include one or more pass-throughs 338 alignable with at least some of the series of outlet holes 318 on the corresponding terminated spray bar (FIGS. 22, 25, 28). The alignment of pass-throughs 338 and outlet holes 318 may facilitate a seamless wall of falling water droplets by continuing the rain curtain from each spray bar 310 and across the corresponding connector portion 331. A spray bar flange 315 (FIG. 18-19) may rim a top and a bottom edge of the spray bar 310, where both the spray bars 310 and the connector portions 331 may preferably have a rectangular cross-section. The spray bar mounting holes 319 may be disposed on the flange 315. An alignment may be configured between mounting holes 339 and 319 so as to align pass-throughs 338 with the series of outlet holes 318.

Additionally, the alignment of the rectangular profiles may provide a means to level the bottom side 314 of the spray bars for producing a flat rain curtain. However, circular and other cross sections (not shown) may be used for providing the integral spray bar 310 by providing a means for connector mounting and leveling.

Referring now to FIGS. 18-28, in a preferred embodiment, each of the connector portions 331 designed to meet at a particular vertex may be 3D printed according to the miter angle (described above) required for a flush meeting among all of the joining surfaces 332. Advantageously, an angle-specific 3D printing process may simplify the design and construction process by allowing a minor angle change in the 3D instruction set to quickly produce a ready-to-use connector having a unique mitered end. Once the connector portions 331 have been fabricated, the N spray bars assigned to the corresponding vertex maybe terminated. The 3D printing process may accommodate at least one or more of the following horizontal angles: 30°, 45°, 60°, 90°, 120°, 135°, 180°, 240°, and 270°.

The connector portion 331 and the spray bar 310 it terminates may be configured for a sealing fit. For example, glue, PVC glue, or a gasket may be employed to water seal the interior volume of the spray bar 310 at the terminated end 311. The horizontal array for producing the walls of falling droplets may be completed by joining the N terminated spray bars assigned to the corresponding vertex with the fabricated portions 331. Mounting holes 319 and 339 may be fastened together to secure the corresponding vertex in the array.

Alternatively, each of the connector portions 331 may be formed by an injection molding process. The molding process may use plastic, PVC, or a metal material, and may include forming the pass-throughs 338. Or, pass-throughs 338 may be drilled after molding. Pass-throughs 338 may comprise oval holes, slots, or an open area in the connector 331 which expose part or all of the series of outlet holes 318 for providing continuity in the rain curtain.

The apparatus for producing a wall of falling water droplets may include a drain floor 72 directly below the array for catching the falling water, as show in FIG. 2. Once the spray bars 310 and the connector portions 331 (or the N-way connectors 330) have been assembled into the horizontal array, the array may be suspended from an overhead structure. The apparatus may also include adapting the array to selectively switch pressurized water to one or more of the water inlets 316 for activating various wall sections of the falling water droplets.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. An apparatus configured to produce a wall of falling water droplets, the apparatus comprising:
 a plurality of tubular integral spray bars, each one of the spray bars extending from one end to another end opposite the one end and including a water inlet adapted for receiving pressurized water, and output holes along a length of each one of the spray bars through which the received water is dischargeable to produce the falling water droplets;
 a plurality of seamless connectors, each one of the connectors configured for joining a first free end of one of at least two of the plurality of spray bars with a second free end of another of the least two of the plurality of spray bars, the joining for forming an array of the plurality of spray bars for producing the wall; and
 wherein the first free end of the one of the at least two of the plurality of spray bars, the second free end of the another of the at least two of the plurality of the spray bars, and an N-way connector of the plurality of connectors joining a set of N spray bars of the plurality of tubular integral spray bars at one vertex are configured relative to one another to make substantially seamless the discharge of droplets across the N-way connector;

a flow regulator disposed interiorly between the water inlet and the series of outlet holes for spreading water received from the water inlet evenly across a length of each one of the spray bars extending from the one end to the another end opposite the one end prior to the discharge of droplets; and wherein the array of the plurality of spray bars is capable of producing the wall of falling water droplets evenly across the series of outlet holes.

2. The apparatus of claim 1, wherein:

the flow regulator comprises a flow regulating shelf integral to each one of the spray bars and partially bisecting an interior volume of the each one of the spray bars into an inlet interior and an outlet interior, the water inlet directly conductive to the inlet interior and the outlet interior directly conductive to the series of outlet holes.

3. The apparatus of claim 2, wherein:

the regulator further includes a flow passageway for inviting resistive flow between an edge of the shelf and an inner surface of the each one of the spray bars.

4. The apparatus of claim 1, further comprising:

a gutter system configured within each of the plurality of spray bars for preventing debris from reaching the series of outlet holes.

5. The apparatus of claim 4, wherein:

the gutter system includes a raised bed containing the series of outlet holes and positioned above a floor portion forming one or more gutters.

6. The apparatus of claim 1, wherein:

the each one of the spray bars are formed as a unified piece by at least one of 1) extruding an extrusion material, 2) gluing together of cut-flat material, and 3) injection molding.

7. The apparatus of claim 1, wherein:

each one of the spray bars are is configured with open ends and a uniform cross-section for being functional when trimmed to a custom length.

8. The apparatus of claim 1, wherein:

the N-way connector of the plurality of connectors is configured to join one of the following: two spray bars, three spray bars, four spray bars, six spray bars, or eight spray bars.

9. An apparatus configured to produce a wall of falling water droplets, the apparatus comprising:

a plurality of tubular integral spray bars, each one of the spray bars extending from one end to another end opposite the one end and including a water inlet adapted for receiving pressurized water, and of output holes along a length of each one of the spray bars through which the received water is dischargeable to produce the falling water droplets;

a plurality of seamless connectors, each one of the connectors configured for joining a first free end of one of at least two of the plurality of spray bars with a second free end of another of the least two of the plurality of spray bars, the joining for forming an array of the plurality of spray bars for producing the wall; and wherein the first free end of the one of the at least two of the plurality of spray bars, the second free end of the another of the at least two of the plurality of the spray bars, and an N-way connector of the plurality of connectors joining a set of N spray bars of the plurality of tubular integral spray bars at one vertex are configured relative to one another to make substantially seamless the discharge of droplets across the N-way connector, and the N-way connector comprises a connector portion for each one of the spray bars joinable at the vertex, the connector portion for each one of the spray bars configured to terminate in a beveled joining surface in a configuration for stably meeting N−1 other connector portions at the vertex.

10. The apparatus of claim 9, wherein:

the N-way connector joining the N spray bars includes one or more pass-throughs alignable with the outlet holes on each joined pair of the spray bars for making seamless the wall of falling water droplets.

11. The apparatus of claim 9, wherein:

the joining surface provides a water cap for sealing an interior portion of the terminated spray bar joinable at the vertex.

12. The apparatus of claim 9, wherein:

the connector portion and the spray bar it terminates are configured for a sealing fit.

13. The apparatus of claim 9, wherein:

the N-way connector accommodates one or more designed horizontal angles between adjacent spray bars joinable at the vertex, and where the N-way connector is formed by at least one of (1) an angle-specific 3D-printing process and (2) an injection molding process.

14. The apparatus of claim 13, wherein:

where the horizontal angles accommodated by the 3D printing process are one or more of the following: 30°, 45°, 60°, 90°, 120°, 135°, 180°, 240°, and 270°.

* * * * *